(12) United States Patent
Nomura et al.

(10) Patent No.: US 11,449,176 B2
(45) Date of Patent: Sep. 20, 2022

(54) INFORMATION PROCESSING SYSTEM AND METHOD FOR AVOIDING EXECUTION OF UNINTENTIONAL DRAWING OPERATIONS

(71) Applicant: Lenovo (Singapore) Pte. Ltd., Singapore (SG)

(72) Inventors: Ryohta Nomura, Kanagawa (JP); Yoshitsugu Suzuki, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/498,451

(22) Filed: Oct. 11, 2021

(65) Prior Publication Data

US 2022/0147221 A1   May 12, 2022

(30) Foreign Application Priority Data

Nov. 11, 2020  (JP) .............................. JP2020-187804

(51) Int. Cl.
*G06F 3/041* (2006.01)
*G06F 3/04883* (2022.01)

(52) U.S. Cl.
CPC ........ *G06F 3/04186* (2019.05); *G06F 3/0414* (2013.01); *G06F 3/04883* (2013.01)

(58) Field of Classification Search
CPC . G06F 3/04186; G06F 3/0414; G06F 3/04883
See application file for complete search history.

(56) References Cited

U.S. PATENT DOCUMENTS

| 9,329,775 B2* | 5/2016 | Nakamura .......... G06F 3/04883 |
| 2014/0253484 A1* | 9/2014 | Nakamura .......... G06F 3/04883 345/173 |
| 2015/0177903 A1* | 6/2015 | Kim .................... G06F 3/04847 345/156 |
| 2017/0371485 A1 | 12/2017 | Ohi |
| 2018/0031886 A1* | 2/2018 | Lightfoot .................. G06F 3/14 |
| 2021/0012574 A1* | 1/2021 | Fu ........................... G06F 3/017 |

FOREIGN PATENT DOCUMENTS

| JP | H10-333817 A | 12/1998 |
| JP | 2013-088891 A | 5/2013 |
| JP | 2018-088112 A | 6/2018 |
| JP | 2019-086965 A | 6/2019 |

* cited by examiner

*Primary Examiner* — Afroza Chowdhury
(74) *Attorney, Agent, or Firm* — Osha Bergman Watanabe & Burton LLP

(57) ABSTRACT

Provided are information processing system and information processing method which make it possible to avoid execution of drawing by a pen touching operation which does not follow a user's intention accurately.

7 Claims, 11 Drawing Sheets

INFORMATION PROCESSING SYSTEM AND METHOD FOR AVOIDING EXECUTION OF UNINTENTIONAL DRAWING OPERATIONS

CROSS-REFERENCE TO RELATED APPLICATIONS

This application claims priority to Japanese Patent Application No. 2020-187804 filed Nov. 11, 2020, the contents of which are hereby incorporated herein by reference in their entirety.

TECHNICAL FIELD

The present disclosure relates to an information processing system and an information processing method.

BACKGROUND

In recent years, there are proposed various technologies for controlling processing which is executed on the basis of a pressure which is applied to a touch position (hereinafter, also referred to as a "pen touch position") of a touch pen in a case where a user performs a touching operation (hereinafter, also referred to as a "pen touching operation") by using the touch pen as an operation medium on a touch screen.

SUMMARY

In one aspect of the present disclosure, an information processing system includes a touch screen, a processor coupled to the touch screen, and a memory. The processor is configured to execute code stored on the memory to acquire first drawing information and second drawing information, each which contains at least touch position information indicating a touch position where a touching operation is performed on the touch screen and pressure information indicating a pressure which is applied to the touch position, calculate change amounts corresponding to movement of the touch position on the basis of the first drawing information and the second drawing information which is acquired after acquisition of the first drawing information, determine, on the basis of the change amounts, whether the touching operation is an operation which is suited for execution of a drawing operation on the touch screen, execute the drawing operation corresponding to the touching operation in response to determining that the touching operation is suited for execution of the drawing operation, and prevent execution of the drawing operation corresponding to the touching operation in response to determining that the touching operation is not suited for execution of the drawing operation.

DETAILED DESCRIPTION

Figure 1:
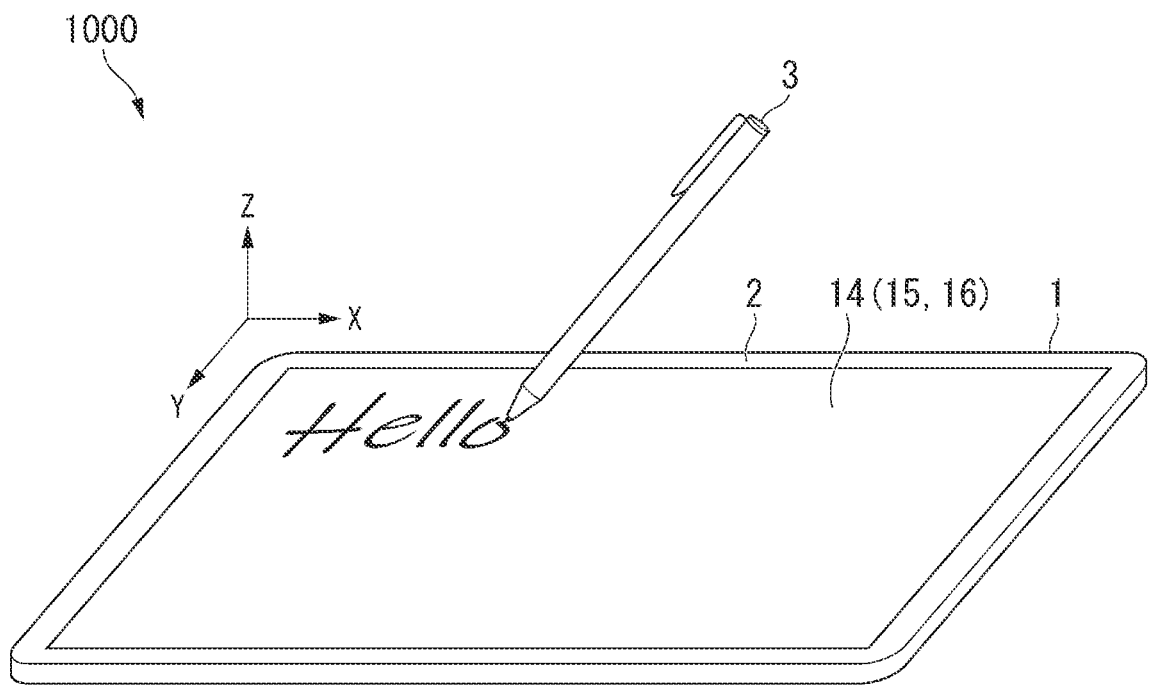
FIG. 1 is a diagram illustrating one example of a system configuration of an information processing system.

There exists technology for controlling display processing which is executed on the pen touch position on the basis of the pressure which is applied to the pen touch position by the pen touching operation which is performed by the user. In this technology, whether a display object is displayed on the pen touch position is controlled depending on, for example, whether the pressure which is applied to the pen touch position is less than a predetermined threshold value.

Incidentally, there are cases where drawing is executed by the pen touching operation which does not follow a user's intention in a situation where the user inputs a character/letter and so forth onto a touch screen in handwriting by using the touch pen. For example, in a case where the operation medium which is in contact with the touch screen slides and moves in a direction which does not follow the user's intention, the drawing which does not follow the user's intention is executed. Incidentally, in a case where the operation medium slides, the pressure which is applied to the pen touch position drops. Accordingly, execution of the drawing which does not follow the user's intention is avoided by utilizing the magnitude of the pressure which is applied to the pen touch position and controlling so as not to execute the drawing, for example, in a case where the pressure which is applied to the pen touch position is less than the predetermined threshold value as seen in the technology.

In the following, respective embodiments of the present disclosure will be described in detail with reference to the drawings. Incidentally, in the drawings, an X-axis, a Y-axis and a Z-axis which are orthogonal to one another are illustrated in the drawings as necessary. On each axis, a direction that an arrow extends will be referred to as a "positive direction" and a direction which is opposite to the positive direction will be referred to as a "negative direction".

<<1. System Configuration>>

First, a system configuration of an information processing system which pertains to each embodiment will be described with reference to FIG. 1. FIG. 1 is a diagram illustrating one example of a system configuration of an information processing system 1000 which pertains to each embodiment. The information processing system 1000 is configured by a tablet terminal 1 (an information processing apparatus) and a touch pen 3 (an operation medium) which are illustrated in FIG. 1.

The tablet terminal 1 is one example of an electronic device which allows input of information by a pen touching operation. The electronic device is not limited to the tablet terminal 1 as long as the terminal is of, at least, the type that a touch screen is loaded on the terminal. The electronic device may be realized by, for example, a laptop PC (Personal Computer) that the touch screen is loaded, a smartphone, a foldable terminal (Foldable Device) that the touch screen is made foldable and so forth. Incidentally, the terminals which realize the electronic device are not limited to such examples.

In addition, there is no specific limitation on the number of touch screens that the electronic device includes. For example, the electronic device may have two displays (a Dual Display type). In this case, one of the two displays may be the touch screen or each of the two displays may be the touch screen.

As illustrated in FIG. 1, the tablet terminal 1 includes a chassis 2 and a touch screen 14. In the following, a description will be made on the assumption that a long-side direction of the touch screen 14 is set as an X-axis direction, a short-side direction of the touch screen 14 is set as a Y-axis direction and a direction which is vertical to the surface of the touch screen 14 is set as a Z-axis direction.

The chassis 2 includes the touch panel 14. As illustrated in FIG. 1, the touch screen 14 is an input/output device which includes a display screen 15 which allows display of various information and a touch panel 16 which allows detection of whether the pen touching operation is performed. In the embodiment in FIG. 1, the pen touching operation is performed by bringing the touch pen 3 into contact with the surface of the touch screen 14.

The touch pen 3 is one example of an operation medium which is used in the pen touching operation which is performed on the touch screen 14. The user inputs, for example, a character/letter, a numeral, a symbol, a figure and so forth in handwriting by the pen touching operation using the touch pen 3. Information which is input in handwriting is drawn on the touch screen 14. The letters "Hello" are drawn on the touch screen 14 which is illustrated in FIG. 1. FIG. 1 illustrates one example of the drawing which is executed in a case where the user inputs the letters "Hello" in handwriting onto the touch screen 14 by using the touch pen 3.

Incidentally, there are cases where drawing which does not follow the user's intention is executed when the user inputs the letter and so forth in handwriting on a general touch screen using the operation medium.

For example, in a situation where the user performs a pen touching operation of moving a position (in the following, also referred to as a "pen touch position") where a pen point is in contact with the touch screen in a state where the user brings the pen point into contact with the touch screen, there are cases where the pen point slides and thereby the position of the pen point moves in a direction which does not follow the user's intention. At this moment, in a case where the position of the pen point moves in the direction which does not follow the user's intention with the pen point remaining in contact with the touch screen, the drawing which does not follow the user's intention is executed. In the drawing which does not follow the user's intention due to sliding of the pen point, a sudden change of a moving direction of the pen touch position (in the following, also referred to as a "drawing direction") and a sudden drop of the pressure which is applied to the pen touch position (in the following, also referred to as a "drawing pressure") simultaneously occur. On the other hand, in a case where the pen touch position moves following the user's intention, the sudden change of the drawing direction and the sudden drop of the drawing pressure do not occur simultaneously. Accordingly, it becomes possible to distinguish the drawing which follows the user's intention from the drawing which does not follow the user's intention depending on whether the sudden drop of the drawing pressure and the sudden change of the drawing direction simultaneously occur.

Figure 2:
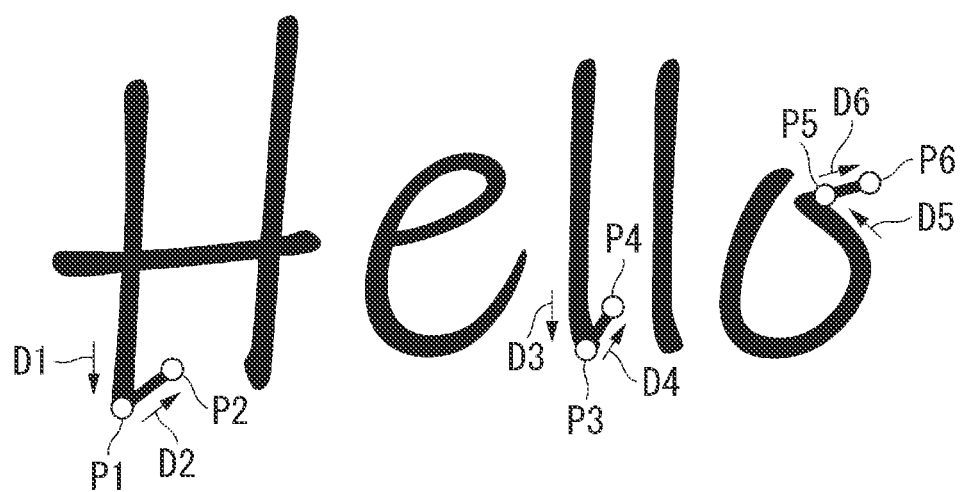
FIG. 2 is a diagram illustrating one example of drawing which is executed on a general touch screen.

Here, one example of the drawing which is executed on the general touch screen will be described with reference to FIG. 2. FIG. 2 is a diagram illustrating one example of the drawing which is executed on the general touch screen. The drawing which is induced by sliding of the pen point and hence does not follow the user's intention is illustrated in FIG. 2. Specifically, respective parts of the drawing which is executed in a section from a position P1 to a position P2, the drawing which is executed in a section from a position P3 and to a position P4 and the drawing which is executed in a section from a position P5 to a position P6 do not follow the user's intention.

For example, in the section from the position P1 to the position P2, the drawing direction considerably changes (suddenly changes) from a direction D1 toward a direction D2 at a timing that the pen point slides at the position P1. At this moment, the drawing pressure which is applied to the position P2 (the pen touch position) considerably drops (suddenly drops) in comparison with the drawing pressure which is applied to the position P1.

In addition, in the section from the position P3 to the position P4, the drawing direction considerably changes (suddenly changes) from a direction D3 toward a direction D4 at a timing that the pen point slides at the position P3. At this moment, the drawing pressure which is applied to the position P4 (the pen touch position) considerably drops (suddenly drops) in comparison with the drawing pressure which is applied to the position P3.

In addition, in the section from the position P5 to the position P6, the drawing direction considerably changes (suddenly changes) from a direction D5 toward a direction D6 at a timing that the pen point slides at the position P5. At this moment, the drawing pressure which is applied to the position P6 (the pen touch position) considerably drops (suddenly drops) in comparison with the drawing pressure which is applied to the position P5.

Incidentally, there exist "sweeping (harai)" and an "upward brushstroke (hane)" that the user intentionally draws but is similar to the drawing illustrated in FIG. 2 that does not follow the user's intention. Here, "harai" and "hane" are Japanese terms that denote types of strokes, and in the present description, these stroke types will be referred to as "sweeping" and "upward brushstroke", respectively. In a case where the user intentionally draws a "sweeping", the user moves the pen point while decreasing the writing pressure in a direction that the user draws the "sweeping". Accordingly, although the drawing pressure suddenly drops when drawing the "sweeping (harai)" which follows the user's intention, the drawing direction does not suddenly change at a timing which is the same as the timing that the drawing pressure suddenly drops. In a case where the user intentionally draws the "upward brushstroke (hane)", the user increases the writing pressure and then moves the pen point in a direction that the upward brushstroke is drawn. Accordingly, although the drawing direction suddenly changes when drawing the upward brushstroke (hane) which follows the user's intention, the drawing pressure does not suddenly drop at a timing which is the same as the timing that the drawing direction suddenly changes. In a case of executing the drawing which follows the user's intention such as the "sweeping (harai)" and the "upward brushstroke (hane)" in this way, the sudden drop of the drawing pressure and the sudden change of the drawing direction occur at different timings.

Accordingly, it becomes possible to distinguish the drawing which follows the user's intention from the drawing which does not follow the user's intention depending on whether at least the sudden drop of the drawing pressure and the sudden change of the drawing direction occur simultaneously.

In view of the above circumstances, in the information processing system 1000 which pertains to each embodiment of the present disclosure, whether the pen touching operation is the operation (the operation which follows the user's intention) which is suited for execution of the drawing is decided depending on whether the sudden drop of the drawing pressure and the sudden change of the drawing direction simultaneously occur. In a case where the pen touching operation is the operation (the operation which follows the user's intention) which is suited for execution of the drawing, the information processing system 1000 sets a drawing mode (a first mode) that drawing of data which accords with the pen touching operation is executed. On the other hand, in a case where the pen touching operation is the operation (the operation which does not follow the user's intention) which is not suited for execution of the drawing, the information processing system 1000 sets a no-drawing mode (a second mode) that the drawing of data which accords with the pen touching operation is not executed. Thereby, the information processing system 1000 makes it possible to accurately avoid the drawing which is executed by the pen touching operation which does not follow the user's intention.

Incidentally, there are also cases where the drawing which does not follow the user's intention is executed in a case where the operation medium is brought into contact with the touch screen with no intention of the user. In the drawing which is executed by contact of the operation medium with the touch screen which does not follow the user's intention, the drawing pressure would considerably drop. On the other hand, in a case where the contact of the touch panel with the operation medium is made in accordance with the user's intention, a drawing pressure which exceeds a certain level is detected at the pen touch position. Accordingly, the information processing system 1000 may control the drawing mode and the no-drawing mode by distinguishing the operation which is suited for execution of the drawing from the operation which is not suited for execution of the drawing depending on whether the drawing pressure is considerably low.

Figure 3:
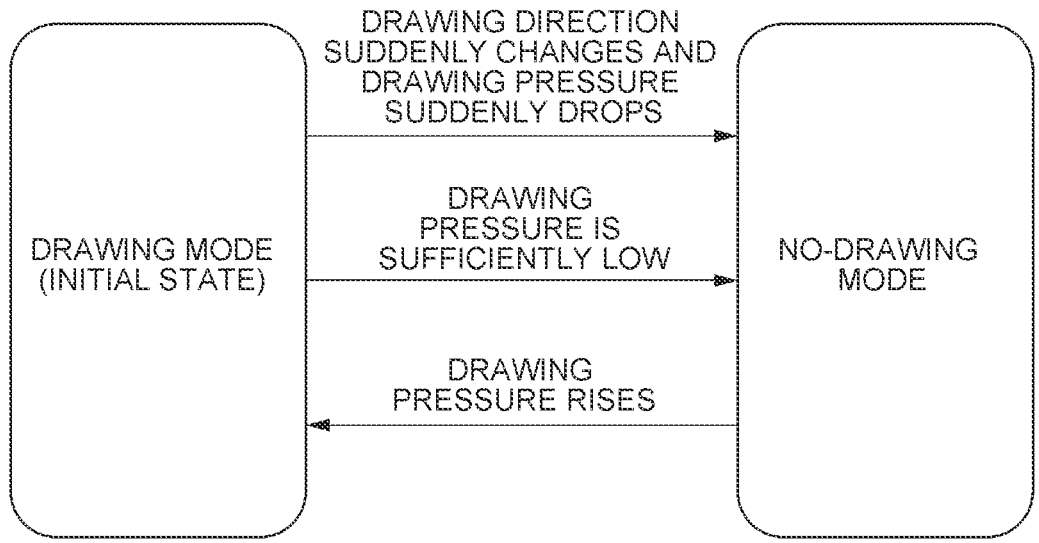
FIG. 3 is a diagram illustrating one example of an outline of a mode transition.

Here, an outline of mode transition which pertains to each embodiment will be described with reference to FIG. 3. FIG. 3 is a diagram illustrating one example of the outline of the mode transition which pertains to each embodiment. The mode transition between the drawing mode and the no-drawing mode is illustrated in FIG. 3. Incidentally, it is supposed that an initial state is the drawing mode.

As illustrated in FIG. 3, in a case where the sudden change of the drawing direction and the sudden drop of the drawing pressure simultaneously occur in the drawing mode as illustrated in FIG. 3, the mode transitions from the drawing mode to the no-drawing mode. In addition, in a case where the drawing pressure is considerably low in the drawing mode, the mode transitions from the drawing mode to the no-drawing mode.

In the no-drawing mode, since the pen touching operation which follows the user's intention is not performed, the drawing pressure (the writing pressure) remains in a low state. In a case where the pen touching operation which follows the user's intention is performed, getting out of a state where the pen touching operation which follows the user's intention is not performed, the user increases the writing pressure. Accordingly, the drawing pressure rises and thereby it becomes possible to decide that the operation (the pen touching operation which follows the user's intention) which is suited for execution of the drawing is being performed from rising of the drawing pressure. Accordingly, in a case where the drawing pressure rises in the no-drawing mode, the mode transitions from the no-drawing mode to the drawing mode.

Figure 4:
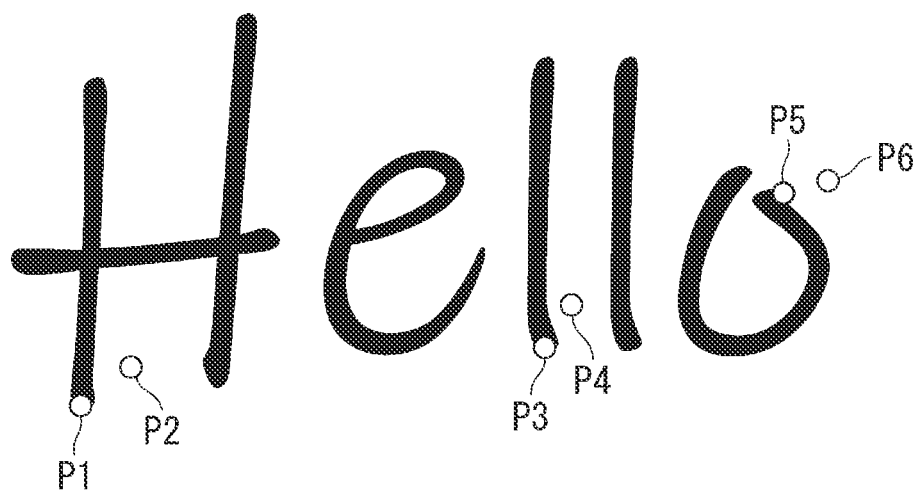
FIG. 4 is a diagram illustrating one example of the drawing which is executed on the touch screen.

Here, one example of the drawing which is executed on the touch screen 14 which pertains to each embodiment will be described with reference to FIG. 4. FIG. 4 is a diagram illustrating one example of the drawing which is executed on the touch screen 14 which pertains to each embodiment. FIG. 4 illustrates one example of the drawing which is executed in a case where the pen touching operation which is the same as the pen touching operation in the example which is illustrated in FIG. 2 is performed on the touch screen 14. Incidentally, it is supposed that the drawing mode is set at the position P1, the position P3 and the position P5.

In the section from the position P1 to the position P2, the sudden change of the drawing direction and the sudden drop of the drawing pressure occur due to sliding of the pen point at the position P1. Accordingly, it is decided that the pen touching operation in the section from the position P1 to the position P2 is the operation which is not suited for execution of the drawing (the pen touching operation which does not follow the user's intention) and the no-drawing mode is set for a while that the pen touch position moves from the position P1 to the position P2. Therefore, the drawing is not executed in the section from the position P1 to the position P2.

Since the no-drawing mode is set also in the section from the position P3 to the position P4 and the section from the position P5 to the position P6, the drawing is not executed in the above sections.

<<2. Hardware Configurations>>

The system configuration of the information processing system 1000 which pertains to each embodiment is described as above. Then, the hardware configurations of the tablet terminal 1 and the touch pen 3 which pertain to each embodiment will be described with reference to FIG. 5 and FIG. 6.

<2-1. Hardware Configuration of Tablet Terminal>

Figure 5:
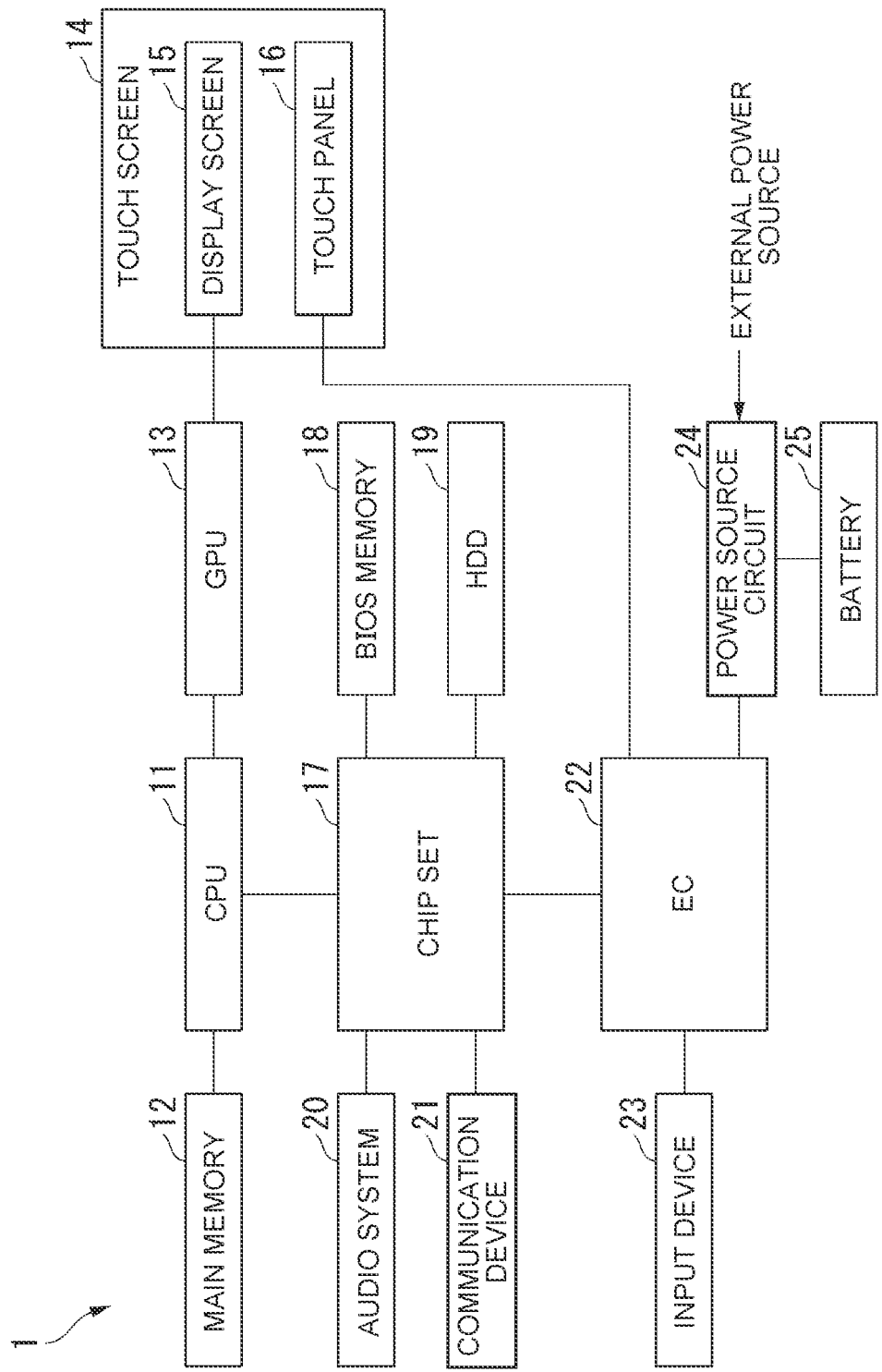
FIG. 5 is a diagram illustrating one example of a hardware configuration of a tablet terminal.

The hardware configuration of the tablet terminal 1 which pertains to each embodiment will be described with reference to FIG. 5. FIG. 5 is a diagram illustrating one example of the hardware configuration of the tablet terminal 1 which pertains to each embodiment. As illustrated in FIG. 5, the tablet terminal 1 includes a CPU (Central Processing Unit) 11, a main memory 12, a GPU (Graphic Processing Unit) 13, a touch screen 14, a display screen, 15, a touch panel 16, a chip set 17, a BIOS (Basic Input Output System) memory 18, an HDD (Hard Disk Drive) 19, an audio system 20, a communication device 21, an EC (Embedded Controller) 22, an input device 23, a power source circuit 24 and a battery 25.

The CPU 11 executes various arithmetic processing under program control and controls the entire operation of the tablet terminal 1.

The main memory 12 is a writable memory which is used as a read-in area for an execution program of the CPU 11 or a work area into which processing data of the execution program is written. The main memory 12 is configured by, for example, a plurality of DRAM (Dynamic Random Access Memory) chips. In the execution program, an OS (Operating System), various drivers for operating peripherals in hardware, various services/utilities, application programs and so forth are contained.

The GPU 13 executes image processing under the control of the CPU 11 and generates display data. The GPU 13 is connected to the display screen 15 and outputs the generated display data onto the display screen 15.

The display screen 15 and the touch panel 16 are installed on the touch screen 14. The touch screen 14 displays various information which accords with display data which is converted to video signals on the display screen 15 and accepts an input operation which is performed with the operation medium by detecting a touch with the operation medium such as a finger of the user, the touch pen and so forth and an access of the operation medium via the touch panel 16.

The display screen 15 is a display device such as, for example, an OLED (Organic Electroluminescence) display and so forth. Incidentally, the display screen 15 may be configured to be bendable (foldable).

The touch panel 16 is arranged in superposition on a display plane of the display screen 15. The touch panel 16 may be configured integrally with the display screen 15 and may be configured to be bendable (foldable) similarly to the display screen 15.

The touch panel 16 detects an operation position. The operation position is specifically a pen touch position where the pen touching operation is performed on the touch screen 14. The pen touch position is indicated, for example, with coordinates. The range of the coordinates of the pen touch position is determined depending on the size of the touch screen 14. Information which indicates the pen touch position on the touch panel 16 such as the coordinates will be also referred to as "pen touch position information" in the following.

The chip set 17 includes controllers for a USB (Universal Serial Bus), a serial ATA (Advanced Technology Attachment) bus, an SPI (Serial Peripheral Interface) bus, a PCI (Peripheral Component Interconnect) bus, a PCI-Express bus, an LPC (Low Pin Count) bus and so forth and a plurality of devices is connected to the chip set 17. In FIG. 5, as one example of the plurality of devices, the CPU 11, the BIOS memory 18, the HDD 19, the audio system 20, the communication device 21 and the EC 22 are connected to the chip set 17.

The BIOS memory 18 is configured by an electrically rewritable nonvolatile memory such as, for example, an EEPROM (Electrically Erasable Programmable Read Only Memory), a flash ROM (Read Only Memory) and so forth. The BIOS memory 18 stores BIOS, system firmware for controlling operations of the EC 22 and so forth and other firmware. The system firmware is executed by the CPU 11 and is different from EC firmware which is executed by the EC 22.

The HDD (one example of the nonvolatile storage device) stores the OS, the various drivers, the various services/utilities, the application programs and various data.

The audio system 20 records, reproduces and outputs sound data. For example, a microphone, loudspeakers and so forth are connected to the audio system 20.

The communication device 21 is connected to other devices to be communicable with the other devices over a wireless or wired communication network and transmits and receives the various data to and from the other devices. The communication device 21 is configured by, for example, a wired LAN (Local Area Network) interface such as an Ethernet (registered trademark) interface and so forth, a wireless LAN interface such as, for example, a Wi-Fi (registered trademark) interface and so forth and other interfaces. Incidentally, the communication device 21 may be also configured by an USB interface and a Bluetooth (registered trademark) interface.

The EC 22 is a One-Chip Microcomputer which monitors and controls operations of various devices (peripherals, sensors and so forth) regardless of a system state of the tablet terminal 1. The EC 22 includes a CPU, a ROM and a RAM (Random Access Memory) which are not illustrated in FIG. 5.

The EC 22 functions as a control unit which operates independently of the CPU 11 and manages mainly an internal operation environment of the tablet terminal 1. The EC 22 reads out a control program (the EC firmware) which is stored in the ROM in advance, executes various kinds of processing which are instructed with various commands which are described in the read-out control program and thereby realizes various functions.

In addition, the EC 22 includes A/D input terminals, D/A output terminals, timers, digital input/output terminals and so forth for a plurality of channels. For example, the input device 23, the power source circuit 24 and so forth are connected to the EC via the above-described input and output terminals and the EC 22 controls operations of the input device 23, the power source circuit 24 and so forth.

The input device 23 is a device which makes an input such as, for example, a power source switch, a function switch and so forth.

The power source circuit 24 includes, for example, a DC/DC converter, a charge/discharge unit, a battery unit, an AC/DC adapter and so forth and converts a DC voltage which is supplied from an external power source or the battery unit to voltages of a plurality of levels which are suitable to operate the tablet terminal 1. In addition, the power source circuit supplies the electric power to respective units of the tablet terminal 1 under the control of the EC 22.

The battery 25 is, for example, a lithium battery. In a case where the electric power is supplied to the tablet terminal 1 from the external power source, the battery 25 is charged via the power source circuit 24. In a case where the electric power is not supplied to the tablet terminal 1 from the external power source, the battery 25 outputs the electric power which is charged via the power source circuit 24 as operating power of the tablet terminal 1.

<2-2. Hardware Configuration of Touch Pen>

Figure 6:
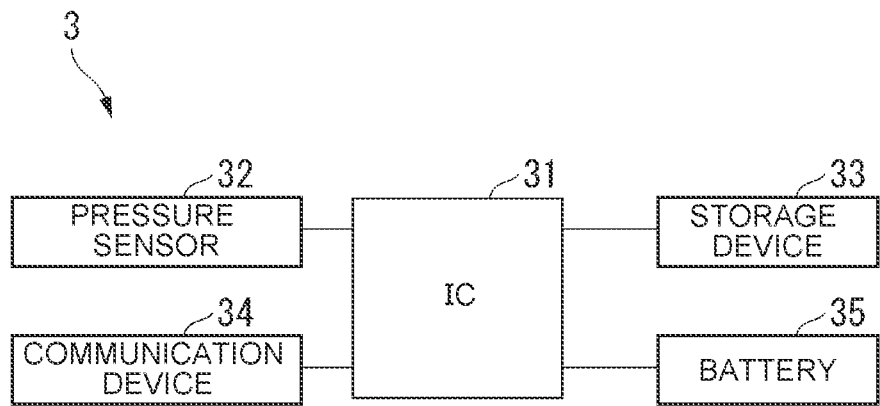
FIG. 6 is a diagram illustrating one example of a hardware configuration of a touch pen.

The hardware configuration of the touch pen 3 which pertains to each embodiment will be described with reference to FIG. 6. FIG. 6 is a diagram illustrating one example of the hardware configuration of the touch pen 3 which pertains to each embodiment. As illustrated in FIG. 6, the touch pen 3 includes an IC (Integrated Circuit) 31, a pressure sensor 32, a storage device 33, a communication device 34 and a battery 35.

The IC 31 executes various arithmetic processing under program control and controls the operation of the entire touch pen 3.

The pressure sensor 32 detects the pressure. Information which indicates the pressure that the pressure sensor 32 detects will be also referred to as "pressure information" in the following.

The storage device 33 stores various information. The storage device 33 is configured by, for example, a ROM, a RAM, an EEPROM and so forth similarly to other memories.

The communication device 34 is connected to other devices to be communicable with other devices over a wireless communication network and transmits and receives various data to and from the other devices. For example, the communication device 34 communicates with the tablet terminal 1 via a communication using a specific protocol of the touch pen 3. The protocol is, for example, Wacom AES (Active Electro Static). The touch pen 3 may also communicate with the tablet terminal via a short-distance wireless communication such as a Bluetooth (registered trademark)-based communication and so forth.

The battery 35 is, for example, a lithium ion battery and an alkaline ion battery. The electric power is supplied from the battery 35 to the IC 31 and the IC 31 adjusts the voltage levels and supplies level-adjusted voltages to the pressure sensor 32, the storage device 33 and the communication device 34.

3. First Embodiment

The hardware configuration of the information processing system 1000 which pertains to each embodiment is described as above. Then, the first embodiment will be described with reference to FIG. 7 to FIG. 11. In the first embodiment, an example that the information processing apparatus is a tablet terminal 1-1 will be described.

<3-1. Outline of First Embodiment>

Figure 7:
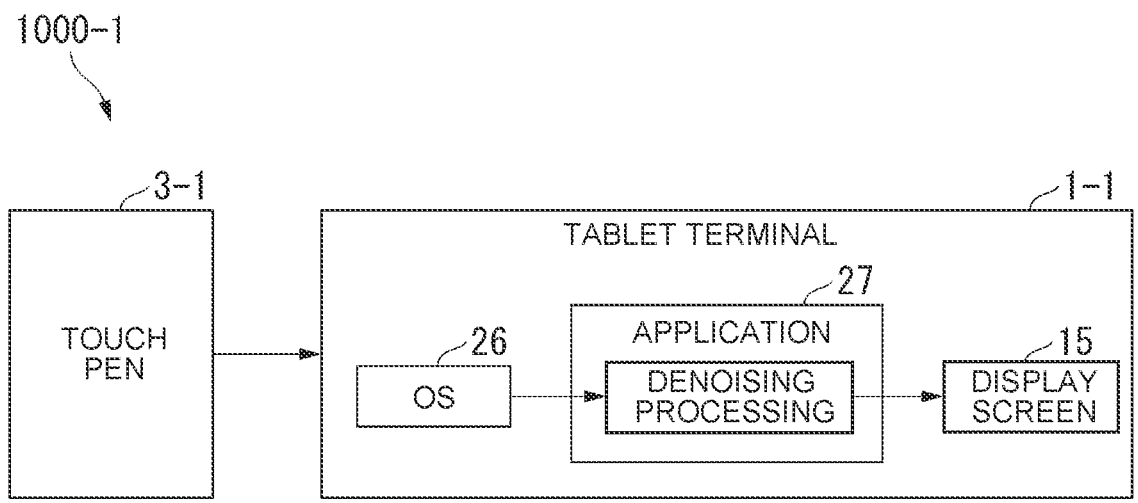
FIG. 7 is a diagram illustrating one example of an outline of an information processing system.

The outline of the first embodiment will be described with reference to FIG. 7. FIG. 7 is a diagram illustrating one example of the outline of the first embodiment. As illustrated in FIG. 7, an information processing system 1000-1 according to the first embodiment is configured by the tablet terminal 1-1 and a touch pen 3-1.

In the first embodiment, processing for controlling so as not to execute the drawing by the pen touching operation which does not follow the user's intention is implemented in the tablet terminal 1-1. In the following, the drawing which is executed by the pen touching operation which does not follow the user's intention will be also referred to as "noise drawing". In addition, processing for controlling so as not to execute the noise drawing will be also referred to as "denoising processing" in the following.

For example, the denoising processing is implemented in an application 27 which is executed on an OS 26 of the tablet terminal 1-1. The application 27 works to execute the denoising processing on the basis of drawing information which is input from the OS 26. The application 27 works to control setting of the drawing mode or the no-drawing mode in accordance with a result of execution of the denoising processing. The application 27 works to output a signal (in the following, also referred to as a "drawing signal") which indicates to execute the drawing in a case where the drawing mode is set to the display screen 15 and to output a signal (in the following, also referred to as a "no-drawing signal") which indicates not to execute the drawing in a case where the no-drawing mode is set to the display screen 15.

Incidentally, the drawing information is drawing-related information which contains at least pressure information and pen touch position information. In the first embodiment, the pressure information is acquired on the touch pen 3-1 side and is transmitted to the tablet terminal 1-1. The pen touch position information is acquired on the tablet terminal 1-1 side.

Owing to implementation of the denoising processing in the application 27, it becomes possible to set a denoising strength in accordance with the kind of the application which is used and the kind of the pen (for example, a pencil, a brush, a ballpoint pen and so forth) which is used in the application 27. In addition, it becomes also possible to change the denoising strength interactively.

<3-2. Functional Configuration of Tablet Terminal>

Figure 8:
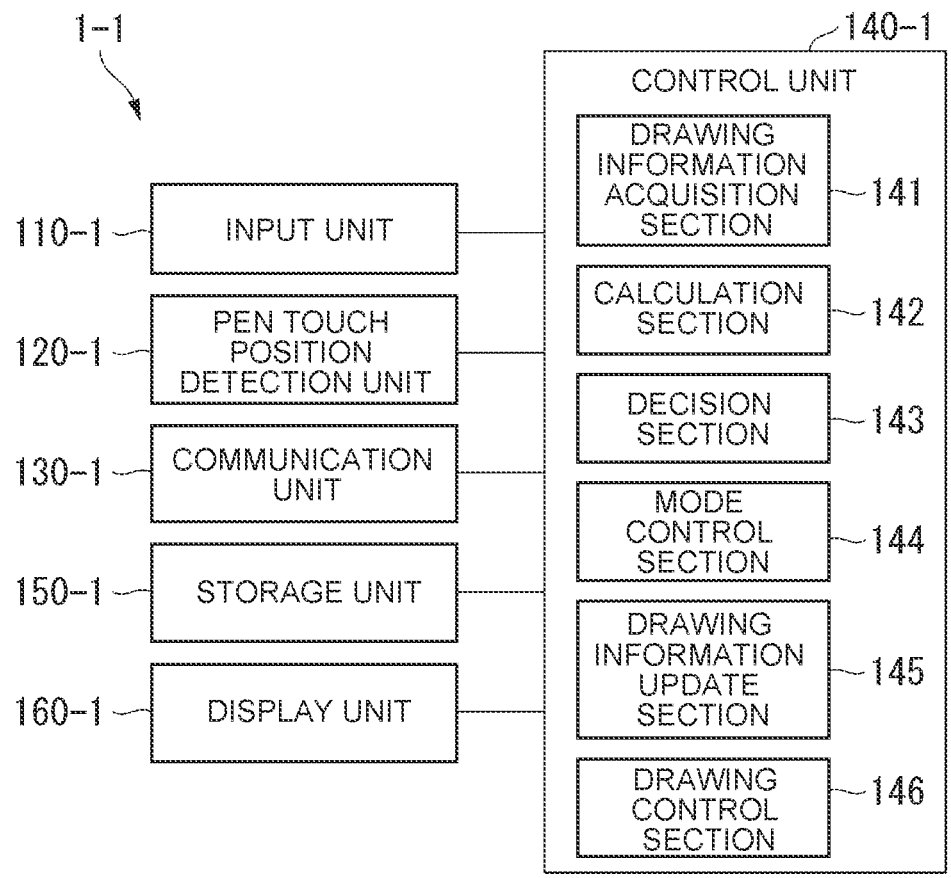
FIG. 8 is a diagram illustrating one example of a functional configuration of a tablet terminal.

The functional configuration of the tablet terminal 1-1 which pertains to the first embodiment will be described with reference to FIG. 8. FIG. 8 is a diagram illustrating one example of the functional configuration of the tablet terminal 1-1 which pertains to the first embodiment. As illustrated in FIG. 8, the tablet terminal 1-1 includes an input unit 110-1, a pen touch position detection unit 120-1, a communication unit 130-1, a control unit 140-1, a storage unit 150-1 and a display unit 160-1.

(1) Input Unit 110-1

The input unit 110-1 has a function of accepting inputs of various information. This function is realized by, for example, the touch screen 14, the input device 23 and so forth which are described with reference to FIG. 5. The input unit 110-1 accepts information that the user inputs via the touch screen 14.

(2) Pen Touch Position Detection Unit 120-1

The pen touch position detection unit 120-1 has a function of detecting the pen touch position on the touch screen 14. This function is realized by, for example, the touch panel 16 which is described with reference to FIG. 5. The pen touch position detection unit 120-1 detects the pen touch position which is obtained, for example, in a case where the user performs the pen touching operation on the touch screen using the operation medium. The pen touch position detection unit 120-1 outputs the detected pen touch position as pen touch position information. Further, the pen touch position detection unit 120-1 acquires also a time stamp which indicates date and time that the pen touch position is detected. The pen touch position detection unit 120-1 outputs the acquired time stamp as time stamp information.

(3) Communication Unit 130-1

The communication unit 130-1 has a function of transmitting and receiving various information. This function is realized by, for example, the communication device 21 which is described with reference to FIG. 5. The communication unit 130-1 receives the pressure information which is transmitted from, for example, the touch pen 3-1.

(4) Control Unit 140-1

The control unit 140-1 has a function of controlling the entire operation of the tablet terminal 1-1. This function is realized by, for example, the CPU 11, the chip set 17 and so forth which are described with reference to FIG. 5. As illustrated in FIG. 8, the control unit 140-1 includes a drawing information acquisition section 141, a calculation section 142, a decision section 143, a mode control section 144, a drawing information update section 145 and a drawing control section 146.

(4-1) Drawing Information Acquisition Section 141

The drawing information acquisition section 141 has a function of acquiring the drawing information. For example, in a case where the pen touching operation which is performed on the touch screen 14 is detected, the drawing information acquisition section 141 acquires the pressure information, the pen touch position information and the time stamp information which correspond to the pen touching operation as the drawing information. Incidentally, there is no specific limitation on the information which is contained in the drawing information as long as at least the pressure information and the pen touch position information are contained in the drawing information.

Specifically, the drawing information acquisition section 141 acquires the pressure information that the communication unit 130-1 receives from the touch pen 3-1. In addition, the drawing information acquisition section 141 acquires the pen touch position information and the time stamp information that the pen touch position detection unit 120-1 outputs. The time stamp indicates the date and time that the pen touching operation which corresponds to the pressure information and the pen touch position information that the drawing information acquisition section 141 acquires is detected.

The drawing information acquisition section 141 outputs the drawing information which contains various information which is acquired from the communication unit 130-1 and the pen touch position detection unit 120-1 to the calculation section 142 in a case where the pen touching operation is detected.

Further, in a case where the pen touching operation Which is performed on the touch screen 14 is detected, the drawing information acquisition section 141 acquires the drawing information which is stored in the storage unit 150-1. Incidentally, the drawing information that the drawing information acquisition section 141 outputs to the calculation section 142 is information which is acquired after acquisition of the drawing information which is stored in the storage unit 150-1. That is, the drawing information that the drawing information acquisition section 141 outputs to the calculation unit 142 is first drawing information and the drawing information which is stored in the storage unit 150-1 is second drawing information. Specifically, the second drawing information is drawing information which is acquired just before acquisition of the first drawing information and is stored in the storage unit 150-1. Accordingly, in the following, the drawing information that the drawing information acquisition section 141 outputs to the calculation section 142 will be referred to as "this-time drawing information" and the drawing information that the drawing information acquisition section 141 acquires from the storage unit 150 will be referred to as "previous-time drawing information". That is, in a case where the pen touching operation which is performed on the touch screen 14 is detected, the drawing information acquisition section 141 acquires also the previous-time drawing information from the storage unit 150-1 and outputs the previous-time drawing information to the calculation section 142 together with the this-time drawing information.

Incidentally, in a case where the drawing information is acquired for the first time, no previous-time drawing information is stored in the storage unit 150-1. Accordingly, the drawing information acquisition section 141 outputs only the this-time drawing information in the case where the drawing information is acquired for the first time.

(4-2) Calculation Section 142

The calculation section 142 has a function of calculating change amounts which relate to movement of the pen touch position. For example, the calculation section 142 calculates the change amounts which relate to the movement of the pen touch position on the basis of the previous-time drawing information and the this-time drawing information which are acquired by the drawing information acquisition section 141.

As one example, the calculation section 142 calculates a change amount of the drawing pressure and a change amount of the drawing direction as the change amounts which relate to the movement of the pen touch position.

Specifically, the calculation section 142 calculates a difference between the drawing pressure that the pressure information which is contained in the this-time drawing information indicates and the drawing pressure that the pressure information which is contained in the previous-time drawing information indicates as the change amount of the drawing pressure. In addition, the calculation section 142 calculates an angle between coordinates of the pen touch position that the pen touch position information which is contained in the this-time drawing information indicates and coordinates of the pen touch position information that the pen touch position information which is contained in the this-time drawing information indicates as the change amount of the drawing direction.

After calculation of the change amounts, the calculation section 142 outputs the change amount of the drawing pressure and the change amount of the drawing direction that the calculation section 142 calculates to the decision section 143.

(4-3) Decision Section 143

The decision section 143 has a function of executing decision processing (in the following, also referred to as "pen touching operation decision processing") as to whether the pen touching operation is the operation which is suited for execution of the drawing. For example, the decision section 143 decides whether the pen touching operation is the operation which is suited for execution of the drawing on the basis of the change amounts which are calculated by the calculation section 142. Incidentally, at least the change amount of the drawing pressure and the change amount of the drawing direction are contained in the change amounts which are input into the decision section 143 from the calculation section 142.

Specifically, it is supposed that the change amount of the drawing pressure (a drop amount of the drawing pressure) is more than a predetermined threshold value (a first threshold value, for example, 80%) and indicates that the drawing pressure suddenly drops and the change amount of the drawing direction is more than a predetermined threshold value (a second threshold value, for example, 20 degrees) and indicates that the drawing direction suddenly changes. In this case, it is found that the sudden drop of the drawing pressure and the sudden change of the drawing direction occur simultaneously. Accordingly, it becomes possible for the decision section 143 to decide that the pen touching operation which does not follow the user's intention is being performed and therefore the pen touching operation is the operation which is not suited for execution of the drawing.

In addition, it is also supposed that the drawing pressure that the pressure information which is contained in the this-time drawing information that the drawing information acquisition section 141 acquires indicates is less than a predetermined threshold value (a fourth threshold value, for example, 100 gf/cm$^2$) and indicates that the drawing pressure is considerably low. In this case, since the drawing pressure is considerably low, it is found that the user does not apply the writing pressure. Accordingly, since the pen touching operation which does not follow the user's intention is being performed, it becomes possible for the decision section 143 to decide that the pen touching operation is the operation which is not suited for execution of the drawing.

In addition, it is further supposed that at a time of decision on whether the pen touching operation is the operation which is suited for execution of the drawing (a first decision time), the decision section 143 decides that the pen touching operation is the operation which is not suited for execution of the drawing at a decision time (a second decision time) which comes before the first decision time. Incidentally, in the following, the first decision time will be referred to as a "this-time decision time" and the second decision time will be referred to as a "previous-time decision time". Further, it is supposed that the drawing pressure which is obtained at the this-time decision time does not rise from the drawing pressure which is obtained at the previous-time decision time. In this case, since the drawing pressure does not rise, it is found that the user does not apply the writing pressure. Accordingly, since the user does not perform the pen touching operation which follows his/her intention and the pen touching operation which does not follow the user's intention is being continuously performed, it becomes possible for the decision section 143 to decide that the pen touching operation is the operation which is not suited for execution of the drawing.

In addition, it is also supposed that the drawing pressure which is obtained at the this-time decision time rises from the drawing pressure which is obtained at the previous-time decision time. In this case, since the drawing pressure rises, it is found that the user applies the writing pressure. Accordingly, since the pen touching operation which follows the user's intention is being performed, it becomes possible for the decision section 143 to decide that the pen touching operation is the operation which is suited for execution of the drawing.

After decision making, the decision section 143 outputs a result of the decision to the mode control section 144.

(4-4) Mode Control Section 144

The mode control section 144 has a function of controlling the mode which relates to the drawing. For example, the mode control section 144 sets either the drawing mode or the no-drawing mode on the basis of the result of decision which is made by the decision section 143. Specifically, in a case where it is decided by the decision section 143 that the pen touching operation is the operation which is suited for execution of the drawing, the mode control section 144 sets the drawing mode. In a case where it is decided by the decision section 13 that the pen touching operation is the operation which is not suited for execution of the drawing, the mode control section 144 sets the no-drawing mode.

The mode control section 144 outputs information which indicates the mode which is set as mode information. The mode information is indicated by, for example, a flag. As one example, in a case where the pen touching operation is the operation which is suited for execution of the drawing, the mode control section 144 sets information (for example, "1") which indicates that the flag is set as the mode information. On the other hand, in a case where the pen touching operation is the operation which is not suited for execution of the drawing, the mode control section 144 sets information (for example, "0") which indicates that the flag is not set as the mode information. Incidentally, as the mode information, information which indicates that the flag is not set in a case where the pen touching operation is the operation which is suited for execution of the drawing and information which indicates that the flag is set in a case where the pen touching operation is the operation which is not suited for execution of the drawing may be also set.

In addition, the mode control section 144 may set either the drawing mode or the no-drawing mode on the basis of the mode which is previously set and a result of decision which is made by the decision section 143. Incidentally, it is possible to confirm the mode which is previously set by referring to mode information which is correlated with the previous-time drawing information which is stored in the storage unit 150-1.

For example, in a case where the mode which is previously set is the drawing mode and the pen touching operation is the operation which is not suited for execution of the drawing, the mode control section 144 sets the no-drawing mode. In a case where the mode which is previously set is the drawing mode and the pen touching operation is the operation which is suited for execution of the drawing, the mode control section 144 maintains a state where the drawing mode is set.

In addition, in a case where the mode which is previously set is the no-drawing mode and the pen touching operation is the operation which is suited for execution of the drawing, the mode control section 144 sets the drawing mode. In a case where the mode which is previously set is the no-drawing mode and the pen touching operation is the operation which is not suited for execution of the drawing, the mode control section 144 maintains a state where the no-drawing mode is set.

The pen touching operation decision processing and mode control processing are executed respectively by the decision section 143 and the mode control section 144 on the basis of only the previous-time drawing information and the this-time drawing information. Accordingly, it becomes possible to minimize the amount of data to be held in the storage section 150-1 and, in addition, also a response to the processing is fast.

(4-5) Drawing Information Update Section 145

The drawing information update section 145 has a function of updating the drawing information. For example, the drawing information update section 145 updates the previous-time drawing information which is stored in the storage unit 150-1 with the this-time drawing information. When updating the information, the drawing information update section 145 makes the storage unit 150-1 store information that the change amount of the drawing pressure, the change amount of the drawing direction and the mode information are correlated with the this-time drawing information. The change amount of the drawing pressure and the change amount of the drawing direction which are correlated with the this-time drawing information are calculated by the calculation section 142 on the basis of the this-time drawing information. In addition, the mode information which is correlated with the this-time drawing information is output from the mode control section 144 on the basis of the this-time drawing information.

(4-6) Drawing Control Section 146

The drawing control section 146 has a function of controlling the drawing on the display unit 160-1. For example, the drawing control section 146 controls the drawing on the display unit 160-1 in accordance with the mode which is set by the mode control section 144. In a case where the drawing mode is set by the mode control section 144, the drawing control section 146 outputs the drawing signal to the display unit 160-1. On the other hand, in a case where the no-drawing mode is set by the mode control section 144, the drawing control section 146 outputs the no-drawing signal to the display unit 160-1.

(5) Storage Unit 150-1

The storage unit 150-1 has a function of storing various information. The storage unit 150-1 is realized by, for example, the ROMs, the RAMs and so forth that the main memory 12, the BIOS memory 18, the HDD 19 and the EC 22 which are described with reference to FIG. 5 include. For example, the storage unit 150-1 stores the drawing information which is updated by the drawing information update section 145. In addition, the storage unit 150-1 stores software such as the OS, various applications and so forth and various firmware such as the system firmware, the EC firmware and so forth and others.

(6) Display Unit 160-1

The display unit 160-1 has a function of displaying various information. The function of the display unit 160-1 is realized by, for example, a display that the information processing apparatus includes as hardware. The display is, for example, the touch screen 14 which is described with reference to FIG. 5.

The display unit 160-1 executes the drawing in accordance with a signal which is input from the drawing control section 146. For example, in a case where the drawing signal is input from the drawing control section 146, the display unit 160-1 executes the drawing which follows the pen touching operation. On the other hand, in a case where the no-drawing signal is input from the drawing control section 146, the display unit 160-1 does not execute the drawing which follows the pen touching operation.

<3-3. Functional Configuration of Touch Pen>

Figure 9:
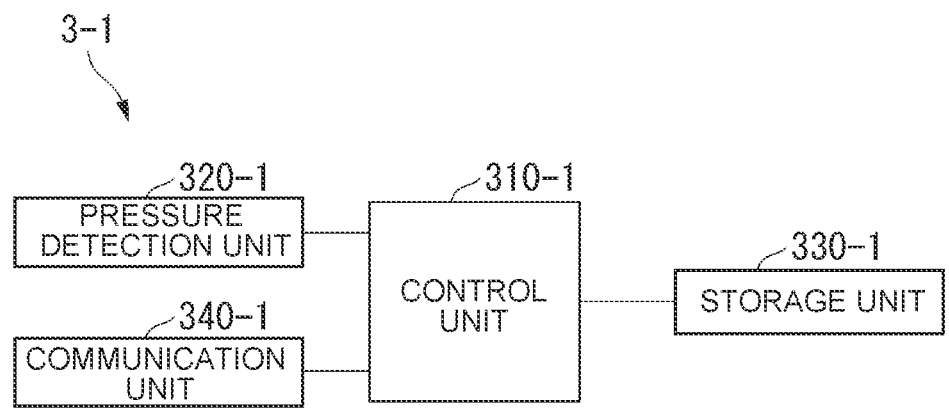
FIG. 9 is a diagram illustrating one example of a functional configuration of a touch pen.

The functional configuration of the touch pen 3-1 which pertains to the first embodiment will be described with reference to FIG. 9. FIG. 9 is a diagram illustrating one example of the functional configuration of the touch pen 3-11 which pertains to the first embodiment. As illustrated in FIG. 9, the touch pen 3-1 includes a control unit 310-1, a pressure detection unit 320-1, a storage unit 330-1 and a communication unit 340-1.

(1) Control Unit 310-1

The control unit 310-1 has a function of controlling the entire operation of the touch pen 3-1. This function is realized by, for example, the IC 31 which is described with reference to FIG. 6.

(2) Pressure Detection Unit 320-1

The pressure detection unit 320-1 has a function of detecting the drawing pressure which is applied by the pen touching operation. This function is realized by, for example, the pressure sensor 32 which is described with reference to FIG. 6.

For example, in a case where the touch pen 3-1 is pressed against the touch screen 14 by the pen touching operation, the pressure detection unit 320-1 detects the pressure (the writing pressure) which is applied to the pen point as the drawing pressure. The pressure detection unit 320-1 outputs the pressure information which indicates the detected drawing pressure.

(3) Storage Unit 330-1

The storage unit 330-1 has a function of storing various information. This function is realized by, for example, the storage device 33 which is described with reference to FIG. 6.

(4) Communication Unit 340-1

The communication unit 340-1 has a function of transmitting and receiving various information. This function is realized by, for example, the communication device 34 which is described with reference to FIG. 6.

For example, the communication unit 340-1 transmits a signal which contains information which relates to the touch pen 3-1 to the tablet terminal 1-1. Specifically, the communication unit 340-1 transmits a signal which contains the pressure information that the pressure detection unit 320-1 outputs to the tablet terminal 1-1.

<3-4. Flow of Processing>

Figure 10:
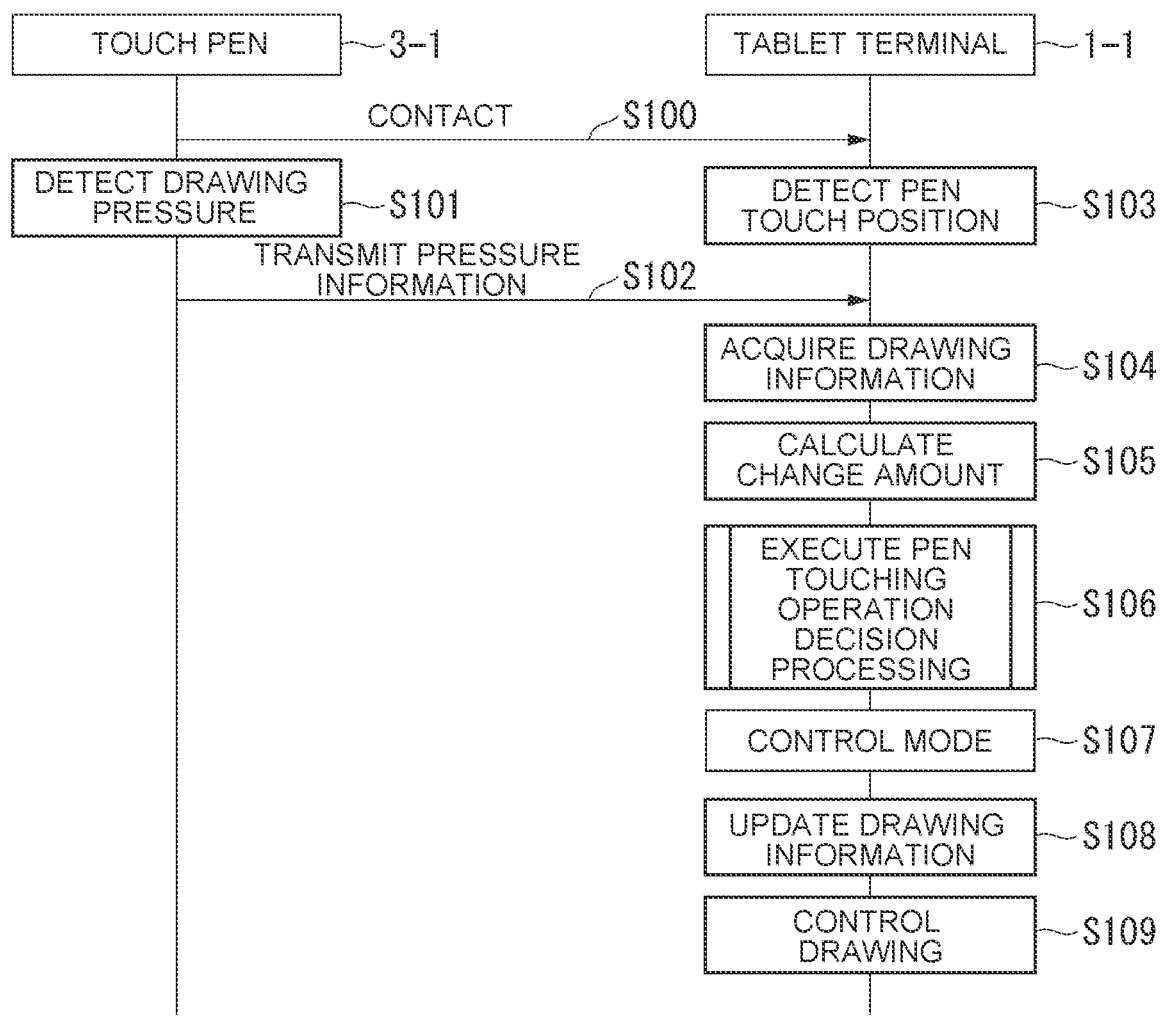
FIG. 10 is a sequence diagram illustrating one example of a flow of processing.

The flow of the processing which pertains to the first embodiment will be described with reference to FIG. 10 and FIG. 11. FIG. 10 is a sequence diagram illustrating one example of the flow of the processing which pertains to the first embodiment.

As illustrated in FIG. 10, first, the touch pen 3-1 is brought into contact with the touch screen 14 of the tablet terminal 1-1 by a user's operation (step S100).

In a case where the touch pen 3-1 is brought into contact with the touch screen 14, the pressure detection unit 320-4 of the touch pen 3-1 detects the drawing pressure (step S101). The pressure detection unit 320-1 outputs the pressure information which indicates the detected drawing pressure. The communication unit 340-1 of the touch pen 3-1 transmits the pressure information that the pressure detection unit 320-1 outputs to the tablet terminal 1-1 (step S102).

In addition, in a case where the touch pen 3-1 is brought into contact with the touch screen 14, the pen touch position detection unit 120-1 of the tablet terminal 1-1 detects the pen touch position and acquires the time stamp (step S103). The pen touch position detection unit 120-1 outputs the pen touch position information which indicates the detected pen touch position and the time stamp information which indicates the acquired time stamp.

The drawing information acquisition unit 141 of the control unit 140-1 of the tablet terminal 1-1 acquires the this-time drawing information and the previous-time drawing information (step S104). For example, the drawing information acquisition section 141 acquires the pressure information which is transmitted from the touch pen 3-1 in step S102 and the pen touch position information and the time stamp information which are respectively detected and acquired by the pen touch position detection unit 120-1 in step S103 and then are output from the pen touch position detection unit 120-1 as the this-time drawing information. In addition, the drawing information acquisition section 141 acquires the drawing information which is stored in the storage unit 150-1 of the tablet terminal 1-1 as the previous-time drawing information.

The calculation section 142 of the control unit 140-1 of the tablet terminal 1-1 calculates the change amounts on the basis of the this-time drawing information and the previous-time drawing information which are acquired by the drawing information acquisition section 141 in step S104 (step S105). Specifically, the calculation section 142 calculates the difference between the pressure information which is contained in the this-time drawing information and the pressure information which is contained in the previous-time drawing information as the change amount of the drawing pressure. In addition, the calculation section 142 calculates the angle between the coordinates of the pen touch position that the pen touch position information which is contained in the this-time drawing information indicates and the coordinates of the pen touch position information that the pen touch position information which is contained in the previous-time drawing information indicates as the change amount of the drawing direction.

The decision section 143 of the control unit 140-1 of the tablet terminal 1-1 executes the pen touching operation decision processing on the basis of the change amounts that the calculation section 142 calculates (step S106). A flow of the pen touching operation decision processing will be described later.

The mode control section 144 of the control unit 140-1 of the tablet terminal 1-1 controls the mode which relates to the drawing on the basis of the result of decision which is made by the decision section 143 (step S107). Specifically, in a case where it is decided that the pen touching operation is the operation which is suited for execution of the drawing by the decision section 143 in step S106, the mode control section 144 sets the drawing mode. On the other hand, in a case where it is decided that the pen touching operation is the operation which is not suited for execution of the drawing by the decision section 143 in step S106, the mode control section 144 sets the no-drawing mode. After mode setting, the mode control section 144 outputs the mode information which indicates the mode which is set.

The drawing information update section 145 of the control unit 140-1 of the tablet terminal 1-1 updates the drawing information which is stored in the storage unit 150-1 (step S108). Specifically, the drawing information update section 145 updates the drawing information which is stored in the storage unit 150-1 with the information that the change amount of the drawing pressure and the change amount of the drawing direction which are calculated by the calculation section 142 in step S105, and the mode information which is controlled by the mode control section 144 in step S107 and then is output from the mode control section 144 are correlated with the this-time drawing information.

The drawing control section 146 of the control unit 140-1 of the tablet terminal 1-1 controls the drawing on the display unit 160-1 of the tablet terminal 1-1 in accordance with the mode which is set by the mode control section 144 (step S109). Specifically, in a case where the drawing mode is set by the mode control section 144 in step S107, the drawing control section 146 outputs the drawing signal to the display unit 160-1. On the other hand, in a case where the no-drawing mode is set by the mode control section 144 in step S107, the drawing control section 146 outputs the no-drawing signal to the display unit 160-1.

Here, the flow of the pen touching operation decision processing will be described with reference to FIG. 11. FIG. 11 is a flowchart illustrating one example of the flow of the pen touching operation decision processing which pertains to each embodiment.

Figure 11:
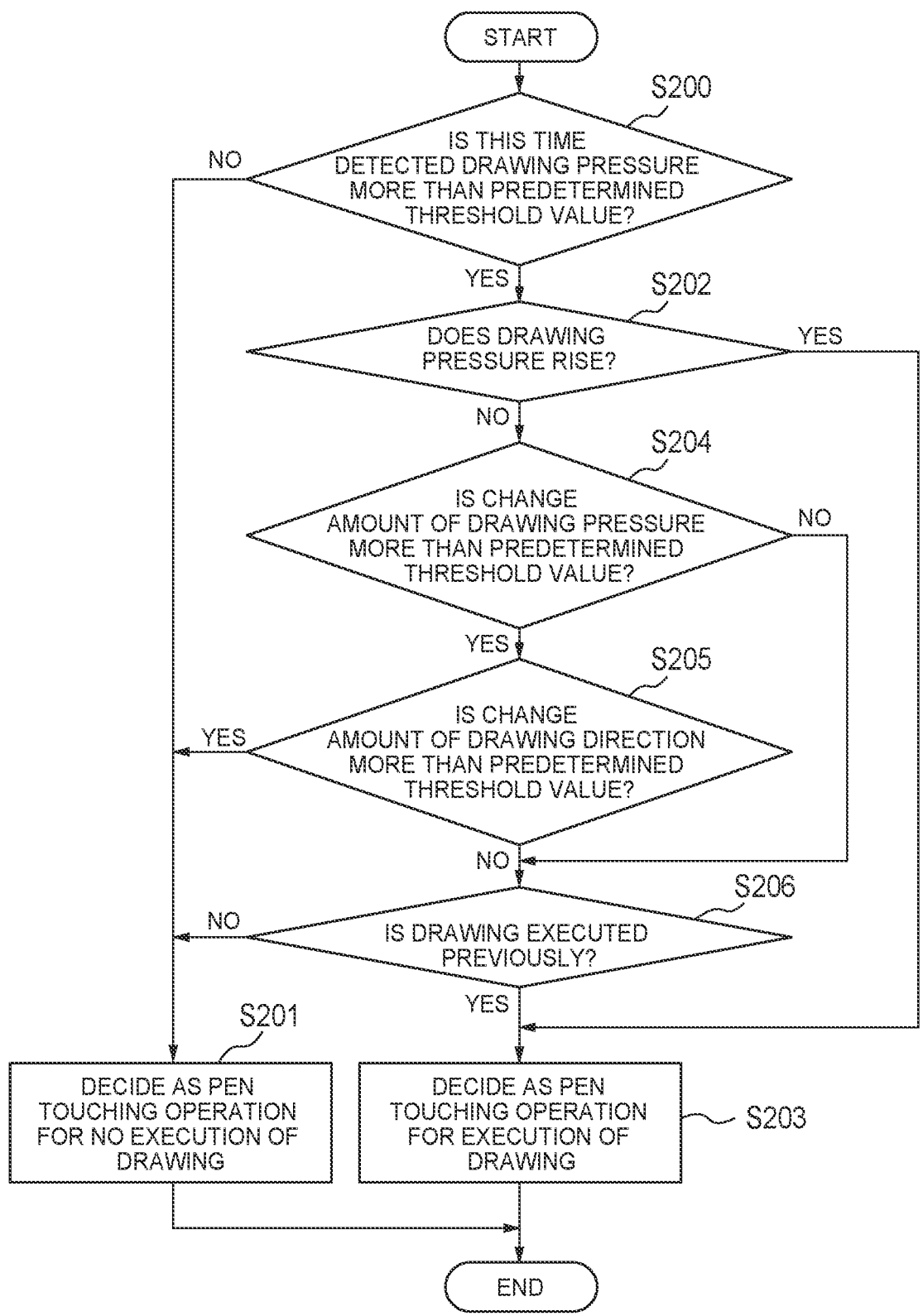
FIG. 11 is a flowchart illustrating one example of a flow of pen touching operation decision processing.

As illustrated in FIG. 11, first, the decision section 143 decides whether the drawing pressure which is detected this time from the pressure information which is contained in the this-time drawing information is more than the predetermined threshold value (the fourth threshold value) (step S200). In a case where the drawing pressure which is detected this time is more than the predetermined threshold value (step S200/YES), the decision section 143 proceeds the process to step S202. On the other hand, in a case where the drawing pressure which is detected this time is not more than the predetermined threshold value (step S200/NO), the decision section 143 decides that the pen touching operation is the operation which is not suited for execution of the drawing (step S201) and terminates execution of the pen touching operation decision processing.

The decision section 143 decides whether the drawing pressure which is detected this time rises from the drawing pressure which is detected previously (step S202). In a case where the drawing pressure rises (step S202/YES), the decision section 143 decides that the pen touching operation is the operation which is suited for execution of the drawing (step S203) and terminates execution of the pen touching operation decision processing. On the other hand, in a case where the drawing pressure does not rise (step S202/NO), the decision section 143 proceeds the process to step S204.

The decision section 143 decides whether the change amount (the drop amount) of the drawing pressure is more than the predetermined threshold value (the first threshold value) (step S204). In a case where the change amount (the drop amount) of the drawing pressure is more than the predetermined threshold value (step S204/YES), the decision section 143 proceeds the process to step S205. On the other hand, in a case where the change amount (the drop amount) of the drawing pressure is not more than the predetermined threshold value (step S204/NO), the decision section 143 proceeds the process to step S206.

The decision section 143 decides whether the change amount of the drawing direction is more than the predetermined threshold value (the second threshold value) (step S205). In a case where the change amount of the drawing direction is more than the predetermined threshold value (step S205/YES), the decision section 143 decides that the pen touching operation is the operation which is not suited for execution of the drawing (step S201) and terminates execution of the pen touching operation decision processing. On the other hand, in a case where the change amount of the drawing direction is not more than the predetermined threshold value (step S205/NO), the decision section 143 proceeds the process to step S206.

The decision section 143 decides whether the drawing which corresponds to the pen touching operation which is detected previously is executed (step S206). In a case where the drawing is executed previously (step S206/YES), the decision section 143 decides that the pen touching operation is the operation which is suited for execution of the drawing (step S203) and terminates execution of the pen touching operation decision processing. On the other hand, in a case where the drawing is not executed previously (step S206/NO), the decision section 143 decides that the pen touching operation is the operation which is not suited for execution of the drawing (step S201) and terminates execution of the pen touching operation decision processing.

As described above, the control unit 140-1 of the tablet terminal 1-1 which pertains to the first embodiment includes the drawing information acquisition section 141, the calculation section 142, the decision section 143 and the mode control section 144.

The drawing information acquisition section 141 acquires the drawing information which contains at least the pen touch position information which indicates the pen touch position where the pen touching operation is performed on the touch screen 14 and the pressure information which indicates the drawing pressure which is applied to the pen touch position.

The calculation section 142 calculates the change amount which relates to movement of the pen touch position on the basis of the previous-time drawing information and the this-time drawing information which are acquired by the drawing information acquisition section 141.

The decision section 143 decides whether the pen touching operation is the operation which is suited for execution of the drawing on the basis of the change amounts which are calculated by the calculation section 142.

In a case where the pen touching operation is the operation which is suited for execution of the drawing, the mode control section 144 sets the drawing mode that the drawing which relates to the pen touching operation is executed. In a case where the pen touching operation is the operation which is not suited for execution of the drawing, the mode control section 144 sets the no-drawing mode that the drawing which relates the pen touching operation is not executed.

Owing to provision of such a configuration, in the tablet terminal 1-1 which pertains to the first embodiment, it becomes possible to decide whether the pen touching operation is the operation which is suited for execution of the drawing on the basis of the change amounts which are calculated from the pen touch position information and the pressure information and then to set either the drawing mode or the no-drawing mode.

Thereby, it becomes possible for the tablet terminal 1-1 to highly accurately decide whether the pen touching operation is the operation which is suited for execution of the drawing in comparison with a case where only the drawing pressure is used for decision making. Then, it becomes possible for the tablet terminal 1-1 to control also mode switching between the drawing mode and the no-drawing mode highly accurately by using the result of decision which is higher in accuracy.

Accordingly, the tablet terminal 1-1 which pertains to the first embodiment makes it possible to accurately avoid the drawing (the noise drawing) caused by the pen touching operation which does not follow the user's intention.

In addition, in the tablet terminal 1-1 which pertains to the first embodiment, the noise is removed from the drawing which is input in handwriting using the touch pen 3-1 highly accurately owing to avoidance of the noise drawing. In particular, the accuracy of removing the noises which generate from the drawing which is executed on the slippery screen is improved. Accordingly, a more desirable result of the drawing is obtained. In addition, it is also possible to expect improvement of recognition accuracy in recognition of the handwritten letter/character.

Incidentally, although the example that the operation medium is the touch pen 3-1 is described in the first embodiment, the present disclosure is not limited to such an example. For example, the operation medium may be a human finger. In this case, the tablet terminal 1-1 further has a constitutional element for detecting the drawing pressure which is applied to the pen touch position on the touch screen 14 in addition to the constitutional elements which are described with reference to FIG. 5 and FIG. 8.

In addition, in the first embodiment, the example that the drawing control section 146 outputs the drawing signal to the display unit 160-1 when the drawing mode is set and outputs the no-drawing signal to the display unit 160-1 when the no-drawing mode is set is described. However, the present disclosure is not limited to such an example. For example, the drawing control section 146 may output the drawing signal to the display unit 160-1 when the drawing mode is set and may not output any signal to the display unit 160-1 when the no-drawing mode is set.

4. Second Embodiment

The first embodiment is described as above. Then, the second embodiment will be described with reference to FIG. 12 to FIG. 15. In the second embodiment, an example that the operation medium is a touch pen 3-2 will be described. Incidentally, a description which duplicates with the description in the first embodiment is omitted.

<4-1. Outline of Second Embodiment>

Figure 12:
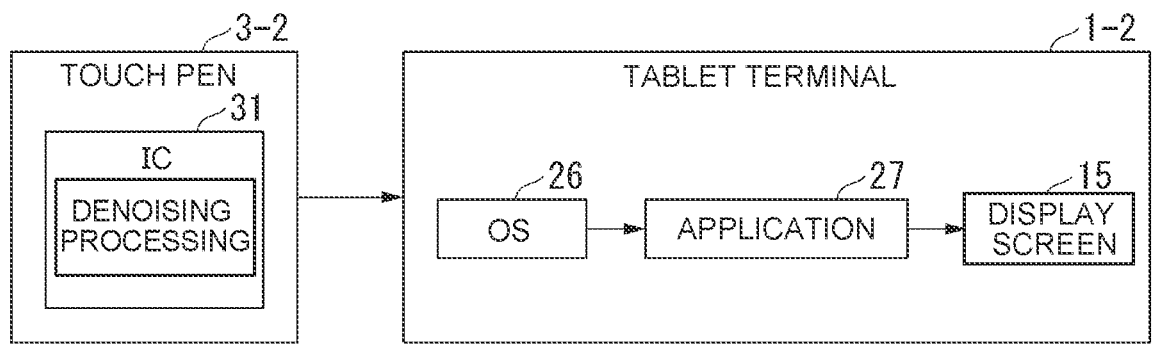
FIG. 12 is a diagram illustrating one example of an outline of an information processing system.

The outline of the second embodiment will be described with reference to FIG. 12. FIG. 12 is a diagram illustrating one example of the outline of the second embodiment. As illustrated in FIG. 12, an information processing system 1000-2 according to the second embodiment is configured by a tablet terminal 1-2 and the touch pen 3-2.

In the second embodiment, the denoising processing is implemented in the touch pen 3-2.

For example, the denoising processing is implemented in the IC 31 of the touch pen 3-2. The IC 31 executes the denoising processing on the basis of the drawing information. The IC 31 controls setting of the drawing mode or the no-drawing mode in accordance with a result of execution of the denoising processing. In a case where the drawing mode is set, the IC 31 transmits the drawing signal to the tablet terminal 1-2. In a case where the no-drawing mode is set, the IC 31 transmits the no-drawing signal to the tablet terminal 1-2.

In a case where the tablet terminal 1-2 receives the drawing signal from the touch pen 3-2, the application 27 which is executed on the OS 26 works to output the drawing signal to the display screen 15. On the other hand, in a case where the tablet terminal 1-2 receives the no-drawing signal from the touch pen 3-2, the application 27 works to output the no-drawing signal to the display screen 15.

Incidentally, in the second embodiment, the pressure information is acquired on the touch pen 3-2 side. The pen touch position information is acquired on the tablet terminal 1-2 side and is transmitted to the touch pen 3-2.

Owing to implementation of the denoising processing in the IC 31, it becomes possible to avoid drawing of the noises regardless of the kind of the application which is installed on the tablet terminal 1-2 side.

<4-2. Functional Configuration of Tablet Terminal>

Figure 13:
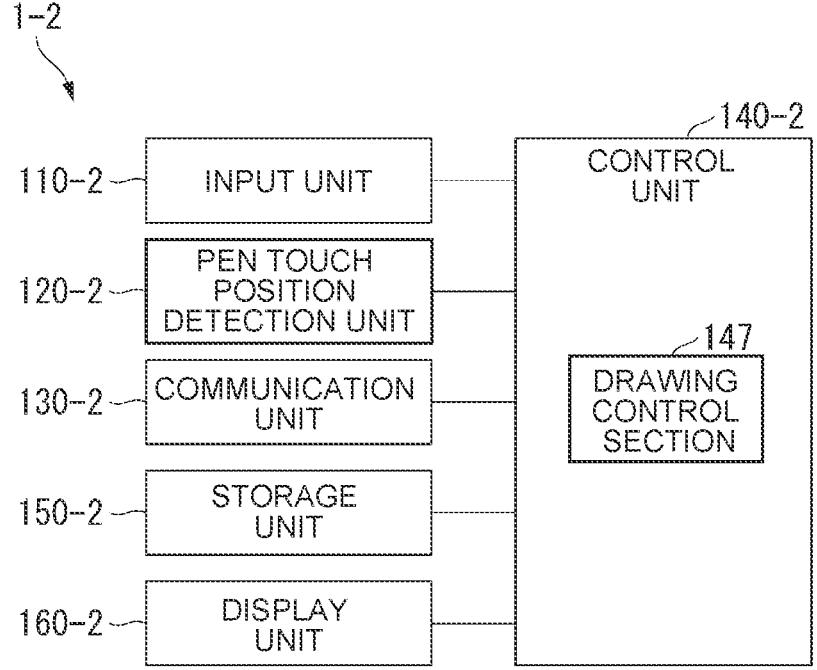
FIG. 13 is a diagram illustrating one example of a functional configuration of a tablet terminal.

The functional configuration of the tablet terminal 1-2 which pertains to the second embodiment will be described with reference to FIG. 13. FIG. 13 is a diagram illustrating one example of the functional configuration of the tablet terminal 1-2 which pertains to the second embodiment. As illustrated in FIG. 13, the tablet terminal 1-2 includes an input unit 110-2, a pen touch position detection unit 120-2, a communication unit 130-2, a control unit 140-2, a storage unit 150-2 and a display unit 160-2.

(1) Input Unit 110-2

Since the function of the input unit 110-2 is the same as the function of the input unit 110-1 which is described with reference to FIG. 8 in the first embodiment, a duplicated description thereof is omitted.

(2) Pen Touch Position Detection Unit 120-2

Since the function of the pen touch position detection unit 120-2 is the same as the function of the pen touch position detection unit 120-1 which is described with reference to FIG. 8 in the first embodiment, a duplicated description thereof is omitted.

(3) Communication Unit 130-2

The communication unit 130-2 has a function of transmitting and receiving various information. This function is realized by, for example, the communication device 21 which is described with reference to FIG. 5. The communication unit 130-2 transmits, for example, the pen touch position information that the pen touch position detection unit 120-2 outputs to the touch pen 3-2. In addition, the communication unit 130-2 receives the signal (for example, either the drawing signal or the no-drawing signal) which is transmitted from the touch pen 3-2.

(4) Control Unit 140-2

The control unit 140-2 has a function of controlling the entire operation of the tablet terminal 1-2. This function is realized by, for example, the CPU 11, the chip set 17 and so forth which are described with reference to FIG. 5. As illustrated in FIG. 13, the control unit 140-2 includes a drawing control section 147.

(4-1) Drawing Control Section 147

The drawing control section 147 has a function of controlling the drawing on the display unit 160-2. For example, the drawing control section 147 controls the drawing on the display unit 160-2 in accordance with the signal that the communication unit 130-2 receives from the touch pen 3-2. In a case where the communication unit 130-2 receives the drawing signal, the drawing control section outputs the drawing signal to the display unit 160-2. On the other hand, in a case where the communication unit 130-2 receives the no-drawing signal, the drawing control section 147 outputs the no-drawing signal to the display unit 160-2.

(5) Storage Unit 150-2

Since the function of the storage unit 150-2 is the same as the function of the storage unit 150-1 which is described with reference to FIG. 8, a duplicated description thereof is omitted. Incidentally, in the second embodiment, the storage unit 150-2 does not store the drawing information.

(6) Display Unit 160-2

Since the function of the display unit 160-2 is the same as the function of the display unit 160-1 which is described with reference to FIG. 8 in the first embodiment, a duplicated description thereof is omitted.

<4-3. Functional Configuration of Touch Pen>

Figure 14:
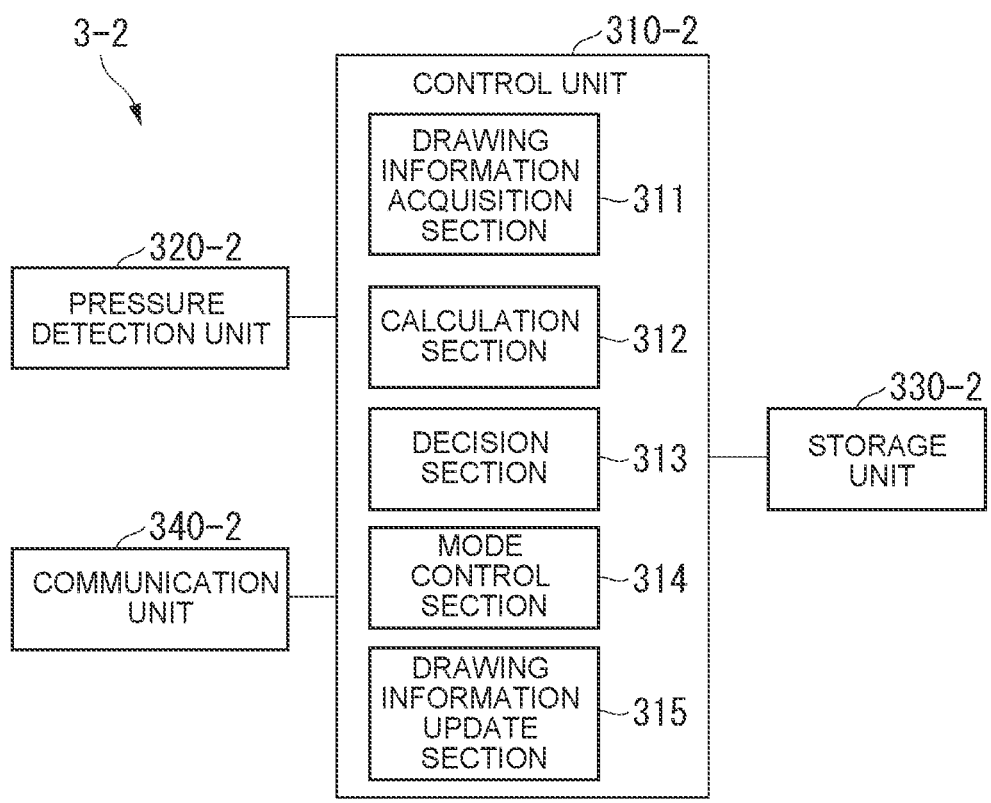
FIG. 14 is a diagram illustrating one example of a functional configuration of a touch pen.

The functional configuration of the touch pen 3-2 which pertains to the second embodiment will be described with reference to FIG. 14. FIG. 14 is a diagram illustrating one example of the functional configuration of the touch pen 3-2 which pertains to the second embodiment. As illustrated in FIG. 14, the touch pen 3-2 includes a control unit 310-2, a pressure detection unit 320-2, a storage unit 330-2 and a communication unit 340-2.

(1) Control Unit 310-2

The control unit 310-2 has a function of controlling the entire operation of the touch pen 3-2. This function is realized by, for example, the IC 31 which is described with reference to FIG. 6. As illustrated in FIG. 14, the control unit 310-2 includes a drawing information acquisition section 311, a calculation section 312, a decision section 313, a mode control section 314 and a drawing information update section 315.

(11-1) Drawing Information Acquisition Section 311

Since the function of the drawing information acquisition section 311 is the same as the function of the drawing information acquisition section 141 which is described with reference to FIG. 8 in the first embodiment, a duplicated description thereof is omitted. Incidentally, the drawing information acquisition section 311 acquires the pressure information that the pressure detection unit 320-2 outputs, and the pen touch position information and the time stamp information that the communication unit 340-2 receives from the tablet terminal 1-2 as the this-time drawing information. In addition, the drawing information acquisition section 311 acquires the drawing information which is stored in the storage unit 330-2 as the previous-time drawing information.

(1-2) Calculation Section 312

Since the function of the calculation section 312 is the same as the function of the calculation section 142 which is described with reference to FIG. 8 in the first embodiment, a duplicated description thereof is omitted.

(1-3) Decision Section 313

Since the function of the decision section 313 is the same as the function of the decision section 143 which is described with reference to FIG. 8 in the first embodiment, a duplicated description thereof is omitted.

(1-4) Mode Control Section 314

Since the function of the mode control section 314 is the same as the function of the mode control section 144 which is described with reference to FIG. 8 in the first embodiment, a duplicated description thereof is omitted. Incidentally, the mode control section 314 transmits the signal which depends on the mode which is set from the communication unit 340-2 to the tablet terminal 1-2. For example, in a case where the drawing mode is set, the mode control section 314 transmits the drawing signal from the communication unit 340-2 to the tablet terminal 1-2. On the other hand, in a case where the no-drawing mode is set, the mode control section 314 transmits the no-drawing signal from the communication unit 340-2 to the tablet terminal 1-2.

(1-5) Drawing Information Update Section 315

Since the function of the drawing information update section 315 is the same as the function of the drawing information update section 145 which is described with reference to FIG. 8 in the first embodiment, a duplicated description thereof is omitted. Incidentally, the drawing information update section 315 updates the drawing information which is stored in the storage unit 330-2.

(2) Pressure Detection Unit 320-2

Since the function of the pressure detection unit 320-2 is the same as the function of the pressure detection unit 320-1 which is described with reference to FIG. 9 in the first embodiment, a duplicated description thereof is omitted.

(3) Storage Unit 330-2

Since the function of the storage unit 330-2 is the same as the function of the storage unit 330-1 which is described with reference to FIG. 9 in the first embodiment, a duplicated description thereof is omitted. Incidentally, the storage unit 330-2 stores the drawing information which is updated by the drawing information update section 315.

(4) Communication Unit 340-2

Since the function of the communication unit 340-2 is the same as the function of the communication unit 340-1 which is described with reference to 9 in the first embodiment, a duplicated description thereof is omitted. Incidentally, the communication unit 340-2 does not transmit a signal which contains the pressure information that the pressure detection unit 320-2 outputs to the tablet terminal 1-2. The communication unit 340-2 transmits the drawing signal or the no-drawing signal to the tablet terminal 1-2 in accordance with the mode that the mode control section 314 sets. In addition, the communication unit 340-2 receives the pen touch position information and the time stamp information which are transmitted from the tablet terminal 1-2.

<4-4. Flow of Processing>

Figure 15:
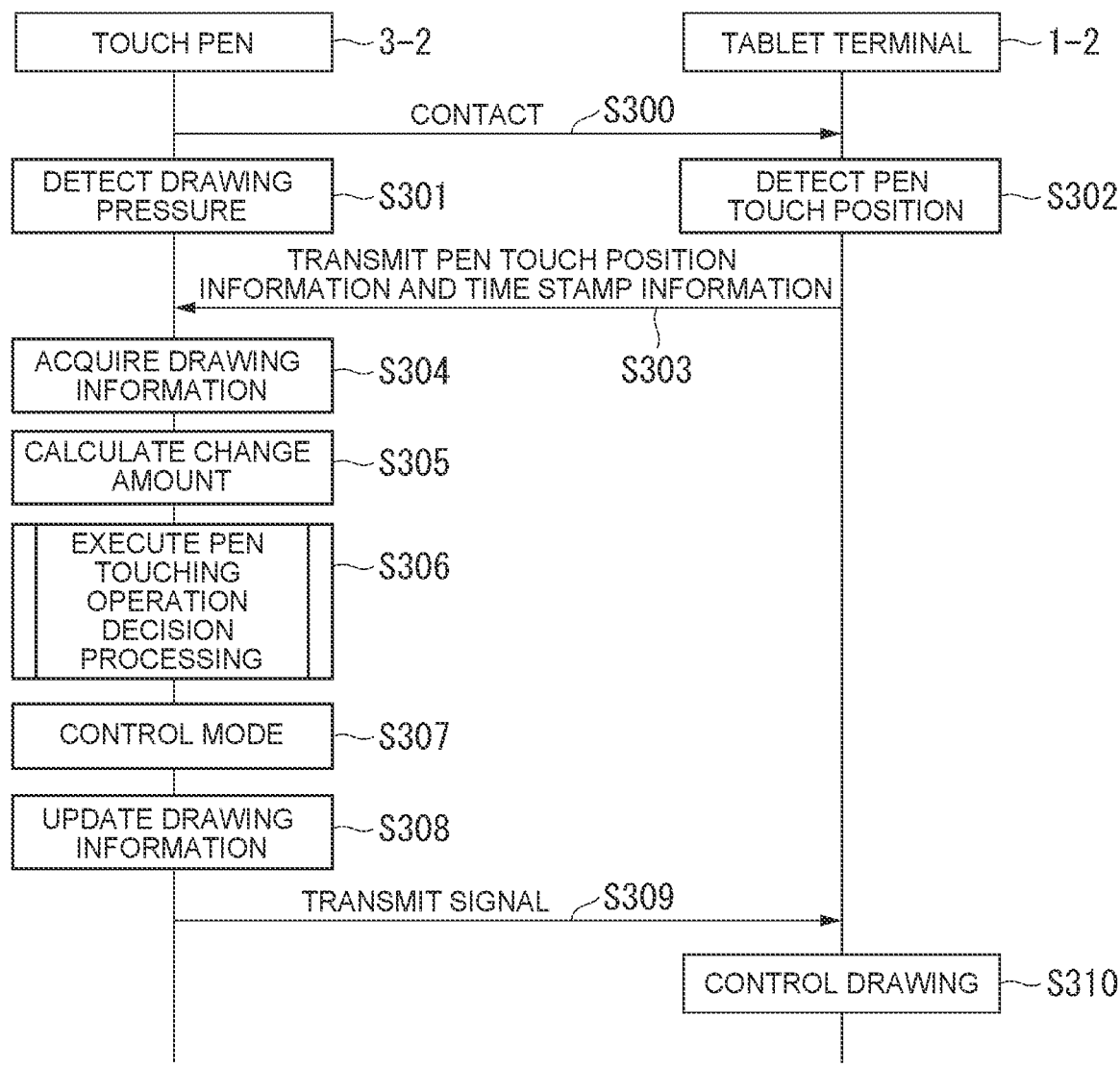
FIG. 15 is a sequence diagram illustrating one example of a flow of processing.

The flow of the processing which pertains to the second embodiment will be described with reference to FIG. 15. FIG. 15 is a sequence diagram illustrating one example of the flow of the processing which pertains to the second embodiment.

As illustrated in FIG. 15, first, the touch pen 3-2 is brought into contact with the touch screen 14 of the tablet terminal 1-2 by the operation of the user (step S300).

In a case where the touch pen 3-2 is brought into contact with the touch screen 14, the pressure detection unit 320-2 of the touch pen 3-2 detects the drawing pressure (step S301). The pressure detection unit 320-2 outputs the pressure information which indicates the detected drawing pressure.

In addition, in a case where the touch pen 3-2 is brought into contact with the touch screen 14, the pen touch position detection unit 120-2 of the tablet terminal 1-2 detects the pen touch position and acquires the time stamp (step S302). The pen touch position detection unit 120-2 outputs the pen touch position information which indicates the detected pen touch position and the time stamp information which indicates the acquired time stamp. The communication unit 130-2 of the tablet terminal 1-2 transmits the pen touch position information and the time stamp information that the pen touch position detection unit 120-2 outputs to the touch pen 3-2 (step S303).

The drawing information acquisition section 311 of the control unit 310-2 of the touch pen 3-2 acquires the this-time drawing information and the previous-time drawing information (step S304). For example, the drawing information acquisition section 311 acquires the pressure information which is detected by the pressure detection unit 320-2 in step S301 and then is output from the pressure detection unit 320-2, and the pen touch position information and the time stamp information which are transmitted from the tablet terminal 1-2 in step S303 as the this-time drawing information. In addition, the drawing information acquisition section 311 acquires the drawing information which is stored in the storage unit 330-2 of the touch pen 3-2 as the previous-time drawing information.

The calculation section 312 of the control unit 310-2 of the tablet terminal 3-2 calculates the change amounts on the basis of the this-time drawing information and the previous-time drawing information which are acquired by the drawing information acquisition section 311 in step S304 (step S305). Specifically, the calculation section 312 calculates the difference between the pressure information which is contained in the this-time drawing information and the pressure information which is contained in the previous-time drawing information as the change amount of the drawing pressure. In addition, the calculation section 312 calculates the angle between the coordinates of the pen touch position that the pen touch position information which is contained in the this-time drawing information indicates and the coordinates of the pen touch position information that the pen touch position information which is contained in the previous-time drawing information indicates as the change amount of the drawing direction.

The decision section 313 of the control unit 310-2 of the touch pen 3-2 executes the pen touching operation decision processing on the basis of the change amounts that the calculation section 312 calculates (step S306). Incidentally, the flow of the pen touching operation decision processing in step S306 is the same as the flow of the processing which is described with reference to FIG. 11 in the first embodiment and therefore a duplicated description thereof is omitted.

The mode control section 314 of the control unit 310-2 of the touch pen 3-2 controls the mode which relates to the drawing on the basis of the result of decision by the decision section 313 (step S307). Specifically, in a case where it is decided by the decision section 313 that the pen touching operation is the operation which is suited for execution of the drawing in step S306, the mode control section 314 sets the drawing mode. On the other hand, in a case where it is decided by the decision section 313 that the pen touching operation is the operation which is not suited for execution of the drawing in step S306, the mode control section 314 sets the no-drawing mode. After mode setting, the mode control section 314 outputs the mode information which indicates the mode which is set.

The drawing information update section 315 of the control unit 310-2 of the touch pen 3-2 updates the drawing information which is stored in the storage unit 330-2 (step S308). Specifically, the drawing information acquisition section 315 updates the drawing information which is stored in the storage unit 330-2 with the information that the change amount of the drawing pressure and the change amount of the drawing direction which are calculated by the calculation section 312 in step S305, and the mode information which is controlled by the mode control section 314 in step S307 and then is output from the mode control section 314 are correlated with the this-time drawing information.

The communication unit 340-2 of the touch pen 3-2 transmits the signal which corresponds to the mode which is set by the mode control section 314 to the tablet terminal 1-2 (step S309). Specifically, in a case where the drawing mode is set by the mode control section 314 in step S307, the communication unit 340-2 transmits the drawing signal to the tablet terminal 1-2. On the other hand, in a case where the no-drawing mode is set by the mode control section 314 in step S307, the communication unit 340-2 transmits the no-drawing signal to the tablet terminal 1-2.

The drawing control section 147 of the control unit 310-2 of the tablet terminal 1-2 controls the drawing which is executed on the display unit 160-2 of the tablet terminal 1-2 in accordance with the signal that the communication unit 130-2 of the tablet terminal 1-2 receives from the touch pen 3-2 (step S310). Specifically, in a case where the communication unit 130-2 receives the drawing signal from the touch pen 3-2, the drawing control section 147 outputs the drawing signal to the display unit 160-2. On the other hand, in a case where the communication unit 130-2 receives the no-drawing signal from the touch pen 3-2, the drawing control section 147 outputs the no-drawing signal to the display unit 160-2.

As described above, the control unit 310-2 of the touch pen 3-2 which pertains to the second embodiment includes the drawing information acquisition section 311, the calculation section 312, the decision section 313 and the mode control section 314.

The drawing information acquisition section 311 acquires the drawing information which at least contains the pen touch position information which indicates the pen touch position where the pen touching operation is performed on the touch screen 14 and the pressure information which indicates the drawing pressure which is applied to the pen touch position.

The calculation section 312 calculates the change amounts which relate to movement of the pen touch position on the basis of the previous-time drawing information and the this-time drawing information which are acquired by the drawing information acquisition section 311.

The decision section 313 decides whether the pen touching operation is the operation which is suited for execution of the drawing on the basis of the change amounts which are calculated by the calculation section 312.

In a case where the pen touching operation is the operation which is suited for execution of the drawing, the mode control section 314 sets the drawing mode for execution of the drawing which follows the pen touching operation. In a case where the pen touching operation is the operation which is not suited for execution of the drawing, the mode control section 314 sets the no-drawing mode for no execution of the drawing which follows the pen touching operation.

Owing to provision of such a configuration, in the touch pen 3-33 which pertains to the second embodiment, it becomes possible to decide whether the pen touching operation is the operation which is suited for execution of the drawing on the basis of the change amounts which are calculated from the pen touch position information and the pressure information and then to set either the drawing mode or the no-drawing mode.

Thereby, it becomes possible for the touch pen 3-2 to highly accurately decide whether the pen touching operation is the operation which is suited for execution of the drawing in compassion with a case where only the drawing pressure is used for decision making. Then, it becomes also possible for the touch pen 3-2 to control mode switching between the drawing mode and the no-drawing mode highly accurately by using a more accurate result of decision.

Accordingly, the touch pen 3-2 which pertains to the second embodiment makes it possible to accurately avoid execution of the drawing (the noise drawing) which is induced by the pen touching operation which does not follow the user's intention.

In addition, in the tablet terminal 1-2 which pertains to the second embodiment, the noises are highly accurately removed from the drawing which is input in handwriting by using the touch pen 3-2 owing to avoidance of the noise drawing. In particular, the accuracy that the noises which are generated from the drawing which is executed on the slippery screen are removed is improved. Accordingly, a more desirable result of execution of the drawing is obtained. In addition, it becomes also possible to expect improvement of recognition accuracy of handwritten letter/character.

Incidentally, in the second embodiment, the example that the drawing information which is updated by the drawing information update section 315 of the control unit 310-2 of the touch pen 3-2 is stored into the storage unit 330-2 of the touch pen 3-2 is described. However, the present disclosure is not limited to such an example. For example, the drawing information which is updated by the drawing information update section 315 may be stored into the storage unit 150-2 of the tablet terminal 1-2. In this case, at the time of acquiring the previous-time drawing information, the drawing information acquisition section 311 of the control unit 310-2 of the touch pen 3-2 acquires the drawing information which is stored in the storage unit 150-2 of the tablet terminal 1-2 as the previous-time drawing information. In addition, at the time of updating the drawing information, the drawing information update section of the control unit 310-2 of the touch pen 3-2 updates the drawing information which is stored in the storage unit 150-2 of the tablet terminal 1-2.

In addition, in the second embodiment, the example that the touch pen 3-2 operates to transmit the drawing signal to the tablet terminal 1-2 in a case where the drawing mode is set and to transmit the no-drawing signal to the tablet terminal 1-2 in a case where the no-drawing mode is set is described. However, the present disclosure is not limited to such an example. For example, the touch pen 3-2 may operate to transmit the drawing signal to the tablet terminal 1-2 in the case where the drawing mode is set and not to transmit any signal to the tablet terminal 1-2 in the case where the no-drawing mode is set.

5. Modified Examples

The second embodiment is described as above. Then, a modified example which pertains to each of the first and second embodiment will be described with reference to FIG. 16.

In each of the first and second embodiments, the example that the change amount of the drawing pressure and the change amount of the drawing direction are contained in the change amounts which are calculated by each of the calculation section 142 (in the first embodiment) and the calculation section 312 (in the second embodiment) is described. However, the present disclosure is not limited to such an example. For example, a change amount of the pen touch position may be further contained in the change amounts which are calculated by each of the calculation section 142 and the calculation section 312. The change amount of the pen touch position is, for example, a distance which ranges from the pen touch position which is previously detected to the pen touch position which is detected this time, that is, a moving distance of pen touch position. Each of the calculation section 142 and the calculation section 312 calculates, for example, the distance between the coordinates of the pen touch position that the pen touch position information which is contained in the this-time drawing information indicates and the coordinates of the pen touch position that the pen touch position information which is contained in the previous-time drawing information indicates as the moving distance.

In a case where the moving distance is further contained in the change amounts which are calculated by each of the calculation section 142 and the calculation section 312, and then in a case where the change (drop) amount of the drawing pressure is more than the predetermined threshold value (the first threshold value), the change amount of the drawing direction is more than the predetermined threshold value (the second threshold value) and the moving distance is more than a predetermined threshold value (a third threshold value, for example, 0.5 mm), each of the decision section 143 and the decision section 313 decides that the pen touching operation is the operation which is not suited for execution of the drawing. It becomes possible for the decision sections 143 and 313 to improve pen touching operation decision accuracy by further using the moving distance in decision of the pen touching operation in this way.

Figure 16:
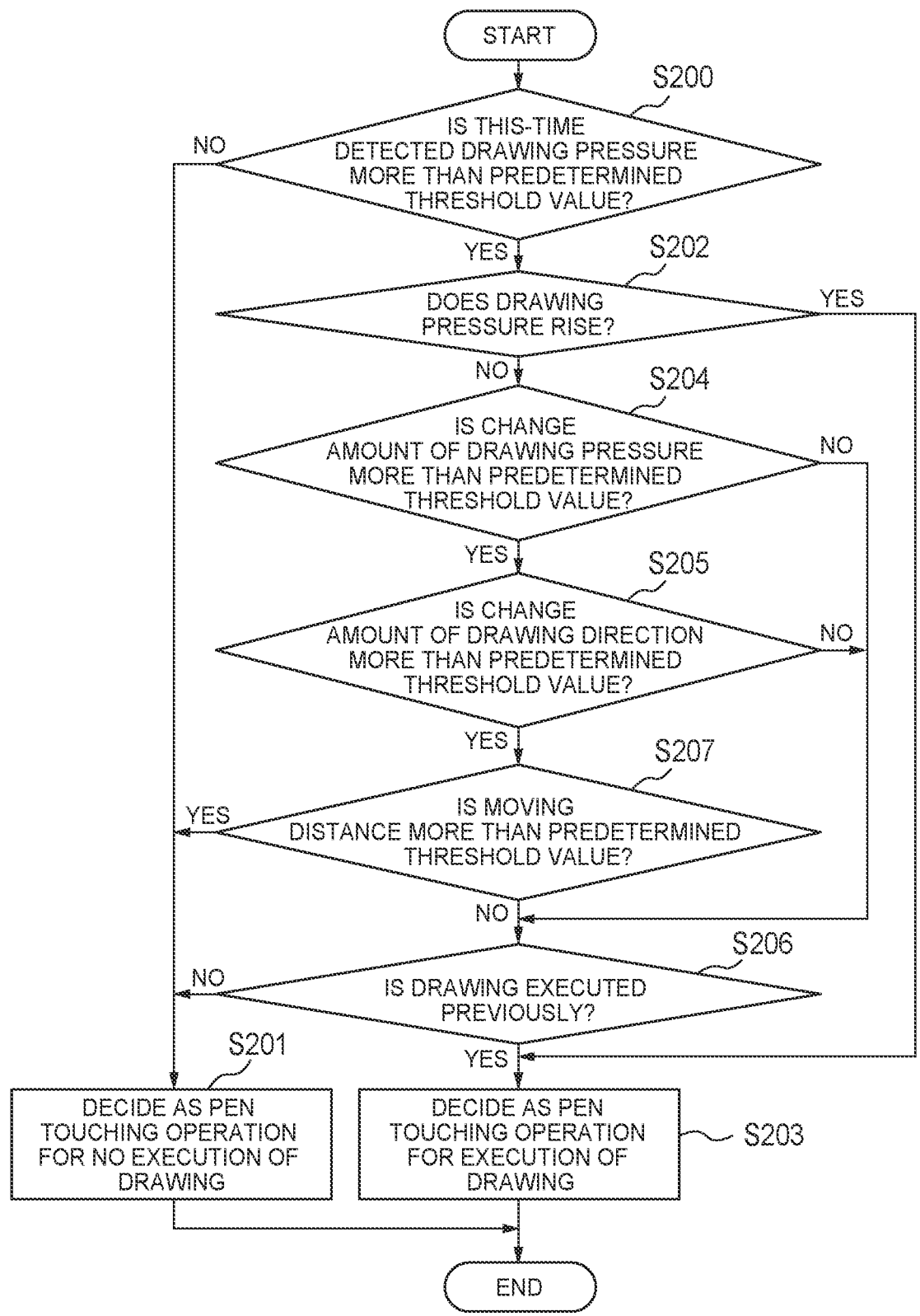
FIG. 16 is a flowchart illustrating one example of a flow of pen touching operation decision processing.

Here, a flow of pen touching operation decision processing which is executed in a case where the moving distance is further contained in the change amounts will be described with reference to FIG. 16. FIG. 16 is a flowchart illustrating one example of the flow of the pen touching operation decision processing which pertains to the modified example of each of the first and second embodiments. The flowchart which is illustrated in FIG. 16 is of the type that step S207 is added to the flowchart which is illustrated in FIG. 11. Incidentally, since step S200, step S201, step S202, step S203, step S204 and step S206 which are illustrated in FIG. 16 are the same as step S200, step S201, step S202, step S203, step S204 and step S206 which are illustrated in FIG. 11, a duplicated description thereof is omitted.

In the flowchart which is illustrated in FIG. 16, in step S205, in a case where the change amount of the drawing direction is more than the predetermined threshold value (step S205/YES), each of the decision section 143 and the decision section 313 proceeds the process to step S207.

Each of the decision section 143 and the decision section 313 decides whether the moving distance is more than the predetermined threshold value (the third threshold value) (step S207). In a case where the moving distance is more than the predetermined threshold value (step S207/YES), each of the decision section 143 and the decision section 313 decides that the pen touching operation is the operation which is not suited for execution of the drawing (step S201)

and terminates execution of the pen touching operation decision processing. On the other hand, in a case where the moving distance is not more than the predetermined threshold value, each of the decision section 143 and the decision section 313 proceeds the process to step S206.

The first and second embodiments and the modified examples of the first and second embodiments of the present disclosure are described as above.

Incidentally, each constitutional element that each of the tablet terminal 1 and the touch pen 3 includes has a computer system therein. Then, each processing in each constitutional element that each of the tablet terminal 1 and the touch pen 3 includes may be executed by recording a program for realizing the function of each constitutional element that each of the tablet terminal 1 and the touch pen 3 includes in a computer-readable recording medium, making the computer system read in the program which is recorded in the recording medium and executing the program. Here, "making the computer system read in the program which is recorded in the recording medium and executing the program" includes to install the program into the computer system. The "computer system" which is called here shall include the OS and hardware such as peripherals and so forth.

In addition, the "computer system" may also include a plurality of computer devices which is connected over a network which includes communication lines such as the Internet, a WAN (Wide Area Network), a LAN (Local Area Network), a privately leased line and so forth. In addition, the "computer-readable recording medium" means portable media such as a flexible disk, a magneto-optical disk, a ROM, a CD (Compact Disk)-ROM and so forth and storage devices such as a hard disk and others which are built in the computer systems. The recording medium which records the program in this way may be also a non-transitory recording medium such as the CD-ROM and so forth.

In addition, the recording medium also include an internally or externally installed recording medium which is accessible from a distribution server in order to distribute the program concerned. Incidentally, as one alternative configuration, one program may be divided into a plurality of programs and, the respective divided programs may be down-loaded at different timings and then may be combined with one another by respective constitutional elements that each of the tablet terminal 1 and the touch pen 3 includes. As another alternative configuration, distribution servers which distribute the divided programs respectively may be different from one another.

Further, the "computer-readable recording medium" shall also include a medium which holds the program for a definite time period such as a nonvolatile memory (RAM) which is built in the computer system which serves as a server and/or a client in a case where the program is transmitted over the network. In addition, the program may be adapted to realize some of the above-described functions. Further, the program may be also a program which makes it possible to realize the above-mentioned functions by being combined with a program which is already recorded in each computer system, that is, a so-called differential file (a differential program).

In addition, some of or all the functions which are described above may be realized as an integrated circuit such as an LSI (Large Scale Integration) and so forth. The respective functions may be processorized individually and/or some of or all the functions may be mutually integrated and then processorized. In addition, a technique of circuit integration may be realized by a private circuit or a general-purpose processor, not limited to the LSI. In addition, in a case where a novel circuit integration technology which realizes an integrated circuit which will take the place of the LSI emerges owing to advancement of the semiconductor technology, the integrated circuit which is realized by the novel technology may be also used.

The first and second embodiments and the modified examples of the first and second embodiments of the present disclosure are described as above with reference to the drawings. However, specific configurations are not limited to the above and it is possible to change the design and so forth in a variety of ways within the range not deviating from the gist of the present disclosure.

What is claimed is:

1. An information processing system comprising:
a touch screen;
a processor coupled to the touch screen; and
a memory, wherein
the processor executes code stored on the memory to:
acquire first drawing information and second drawing information, each of which contains at least touch position information indicating a touch position where a touching operation is performed on the touch screen and pressure information indicating a pressure which is applied to the touch position,
calculate change amounts, corresponding to movement of the touch position, based on the first drawing information and the second drawing information which is acquired after acquisition of the first drawing information,
determine, based on the change amounts, whether the touching operation is suited for execution of a drawing operation on the touch screen,
execute the drawing operation corresponding to the touching operation in response to determining that the touching operation is suited for execution of the drawing operation, and
prevent execution of the drawing operation corresponding to the touching operation in response to determining that the touching operation is not suited for execution of the drawing operation,
the change amounts which are calculated by the processor contain at least a change amount of the pressure which is applied to the touch position and a change amount of a moving direction of the touch position, and
the processor determines that the touching operation is not suited for execution of the drawing operation in a case where:
the change amount of the pressure is more than a first threshold value and indicates that a sudden drop of the pressure has occurred,
the change amount of the moving direction is more than a second threshold value and indicates that a sudden change of the moving direction has occurred, and
the sudden drop of the pressure and the sudden change of the moving direction occur simultaneously.

2. An information processing system comprising:
an information processing apparatus, wherein
the information processing apparatus comprises:
a drawing information acquisition section that acquires drawing information which at least contains touch position information which indicates a touch position where a touching operation is performed on a touch screen and pressure information which indicates a pressure which is applied to the touch position, a calculation section that calculates change amounts which relate to movement of the touch position based on first drawing information which is acquired by the drawing information acquisition section and second drawing information which is acquired, by the drawing information acquisition section, after acquisition of the first drawing information, a decision section that decides whether the touching operation is suited for execution of drawing based on the change amounts which are calculated by the calculation section, and a mode control section that sets a first mode for execution of the drawing which relates to the touching operation in a case where it is decided that the touching operation is suited for execution of the drawing by the decision section and to set a second mode for no execution of the drawing which relates to the touching operation in a case where it is decided that the touching operation is not suited for execution of the drawing by the decision section, the change amounts which are calculated by the calculation section contain at least a change amount of the pressure which is applied to the touch position and a change amount of a moving direction of the touch position, and the decision section decides that the touching operation is not suited for execution of the drawing in a case where:
the change amount of the pressure is more than a first threshold value and indicates that a sudden drop of the pressure has occurred,
the change amount of the moving direction is more than a second threshold value and indicates that a sudden change of the moving direction has occurred, and
the sudden drop of the pressure and the sudden change of the moving direction occur simultaneously.

3. The information processing system according to claim 2, wherein
the change amounts which are calculated by the calculation section further contain a moving distance of the touch position, and
in a case where the change amount of the pressure is more than the first threshold value, the change amount of the moving direction is more than the second threshold value and the moving distance is more than a third threshold value, the decision section decides that the touching operation is not suited for execution of the drawing.

4. The information processing system according to claim 2, wherein
in a case where the pressure that the pressure information which is contained in the second drawing information is less than a fourth threshold value and the pressure is considerably low, the decision section decides that the touching operation is not suited for execution of the drawing.

5. The information processing system according to claim 2, wherein
in a case where the decision section decides that the touching operation is not suited for execution of the drawing at a first decision time and the pressure, which is obtained at a second decision time after the first decision time, does not rise from the pressure which is obtained at the first decision time, the decision section decides that the operation, which is not suited for execution of the drawing, is being continuously performed.

6. The information processing system according to claim 2, wherein
in a case where the pressure which is obtained at a first decision time rises exceeding the pressure which is obtained at a second decision time which comes before the first decision time, the decision section decides that the touching operation is suited for execution of the drawing.

7. An information processing method comprising:
acquiring drawing information which at least contains touch position information which indicates a touch position where a touching operation is performed on a touch screen and pressure information which indicates a pressure which is applied to the touch position by a drawing information acquisition section;

calculating change amounts which relate to movement of the touch position on the basis of first drawing information which is acquired by the drawing information acquisition section and second drawing information which is acquired after acquisition of the first drawing information by the drawing information acquisition section, by a calculation section;

deciding whether the touching operation is suited for execution of drawing based on the change amounts which are calculated by the calculation section, by a decision section; and setting a first mode for execution of the drawing which relates to the touching operation in a case where it is decided that the touching operation is suited for execution of the drawing by the decision section and setting a second mode for no execution of the drawing which relates to the touching operation in a case where it is decided that the touching operation is not suited for execution of the drawing by the decision section, by a mode control section, wherein the change amounts which are calculated by the calculation section contain at least a change amount of the pressure which is applied to the touch position and a change amount of a moving direction of the touch position, and the decision section decides that the touching operation is not suited for execution of the drawing in a case where:
the change amount of the pressure is more than a first threshold value and indicates that a sudden drop of the pressure has occurred,
the change amount of the moving direction is more than a second threshold value and indicates that a sudden change of the moving direction has occurred, and
the sudden drop of the pressure and the sudden change of the moving direction occur simultaneously.

* * * * *